US009253248B2

(12) United States Patent
Reed et al.

(10) Patent No.: US 9,253,248 B2
(45) Date of Patent: Feb. 2, 2016

(54) PARALLEL INFORMATION SYSTEM UTILIZING FLOW CONTROL AND VIRTUAL CHANNELS

(75) Inventors: Coke S. Reed, Austin, TX (US); Ron Denny, Brooklyn Park, MN (US); Michael Ives, Hortonville, WI (US); Thaine Hock, Longmont, CO (US)

(73) Assignee: Interactic Holdings, LLC, New York, NY (US)

( * ) Notice: Subject to any disclaimer, the term of this patent is extended or adjusted under 35 U.S.C. 154(b) by 285 days.

(21) Appl. No.: 13/297,201

(22) Filed: Nov. 15, 2011

(65) Prior Publication Data
US 2015/0188987 A1 Jul. 2, 2015

Related U.S. Application Data

(60) Provisional application No. 61/413,708, filed on Nov. 15, 2010.

(51) Int. Cl.
*H04L 29/08* (2006.01)
*H04L 12/24* (2006.01)
*G06F 15/173* (2006.01)

(52) U.S. Cl.
CPC .............. *H04L 67/10* (2013.01); *H04L 41/04* (2013.01); *G06F 15/17318* (2013.01); *G06F 15/17393* (2013.01)

(58) Field of Classification Search
None
See application file for complete search history.

(56) References Cited

U.S. PATENT DOCUMENTS

| | | | | |
|---|---|---|---|---|
| 6,754,207 B1* | 6/2004 | Hesse | | 370/388 |
| 6,977,930 B1* | 12/2005 | Epps et al. | | 370/392 |
| 6,993,621 B1* | 1/2006 | Black et al. | | 710/317 |
| 7,215,662 B1* | 5/2007 | Lim et al. | | 370/352 |
| 7,352,763 B2* | 4/2008 | Burton et al. | | 370/412 |
| 7,443,878 B2* | 10/2008 | Hendel et al. | | 370/463 |
| 2002/0110130 A1* | 8/2002 | Benayoun et al. | | 370/401 |
| 2004/0015599 A1* | 1/2004 | Trinh et al. | | 709/232 |
| 2004/0260829 A1* | 12/2004 | Husak et al. | | 709/232 |
| 2005/0018609 A1* | 1/2005 | Dally et al. | | 370/235 |
| 2006/0165112 A1* | 7/2006 | Varma | | 370/428 |
| 2007/0110087 A1* | 5/2007 | Abel et al. | | 370/412 |
| 2007/0195761 A1* | 8/2007 | Tatar et al. | | 370/389 |
| 2008/0031262 A1* | 2/2008 | Nishizaki et al. | | 370/395.71 |
| 2008/0317015 A1* | 12/2008 | Beshai | | 370/380 |
| 2009/0125574 A1* | 5/2009 | Mejdrich et al. | | 707/206 |
| 2009/0282419 A1* | 11/2009 | Mejdrich et al. | | 719/314 |
| 2010/0118885 A1* | 5/2010 | Congdon | | 370/419 |
| 2010/0246275 A1* | 9/2010 | Aybay | | 365/189.02 |
| 2010/0302952 A1* | 12/2010 | Hoshi | | 370/250 |
| 2011/0173399 A1* | 7/2011 | Chen et al. | | 711/154 |
| 2013/0083793 A1* | 4/2013 | Lea | | 370/388 |
| 2013/0201994 A1* | 8/2013 | Beshai | | 370/401 |

(Continued)

*Primary Examiner* — Greg C Bengzon

(57) ABSTRACT

Embodiments of a data handling apparatus can include a network interface controller configured to interface a processing node to a network. The network interface controller can include a network interface, a register interface, a processing node interface, and logic. The network interface can include lines coupled to the network for communicating data on the network. The register interface can include lines coupled to multiple registers. The processing node interface can include at least one line coupled to the processing node for communicating data with a local processor local to the processing node wherein the local processor can read data to and write data from the registers. The logic can receive packets including a header and a payload from the network and can insert the packets into the registers as indicated by the header.

24 Claims, 17 Drawing Sheets

(56) References Cited

U.S. PATENT DOCUMENTS

2014/0160935 A1* 6/2014 Zecharia et al. .............. 370/235
2014/0314099 A1* 10/2014 Dress ............................ 370/422
2015/0071079 A1* 3/2015 Kadosh et al. ................ 370/237

* cited by examiner

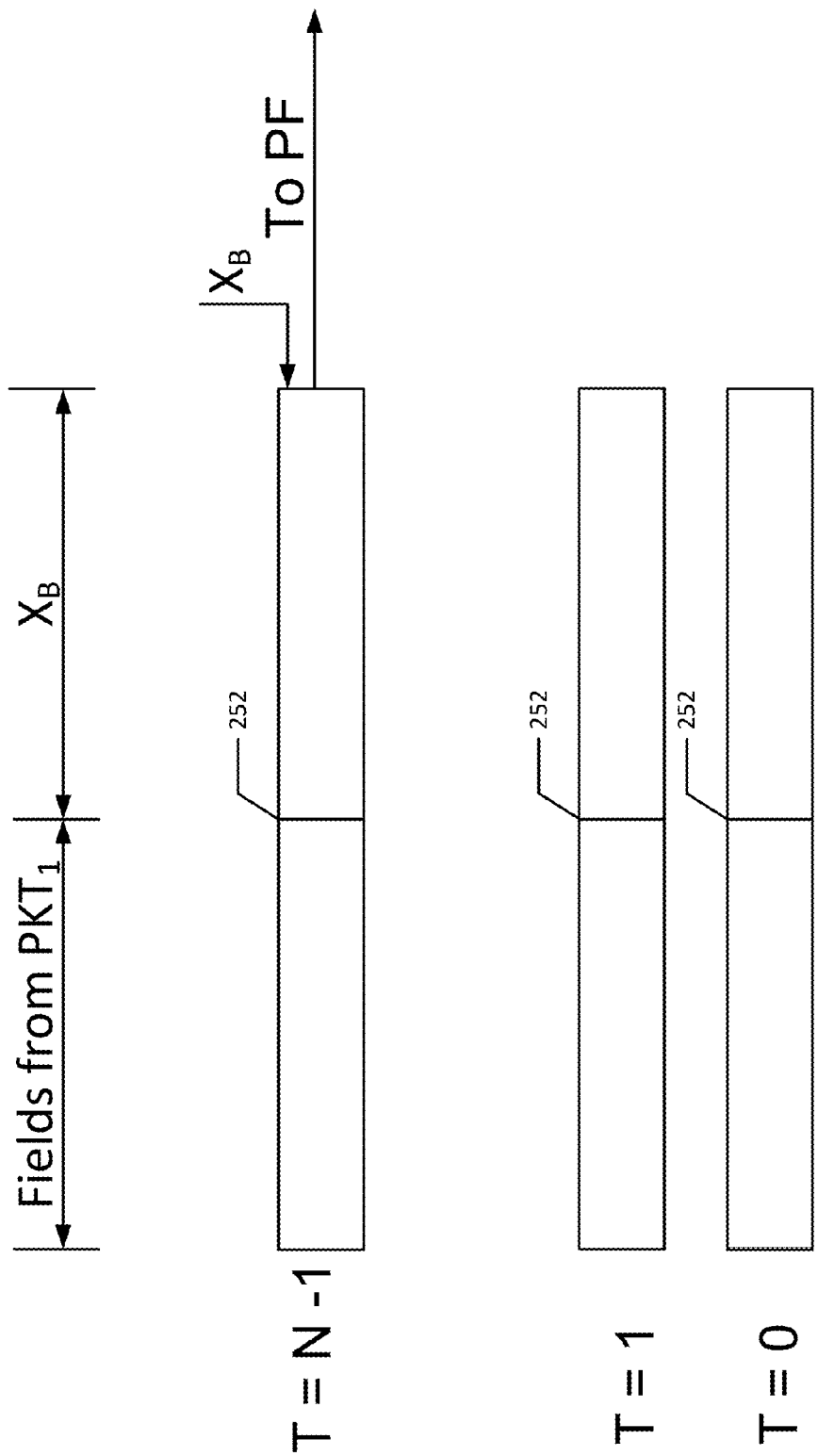

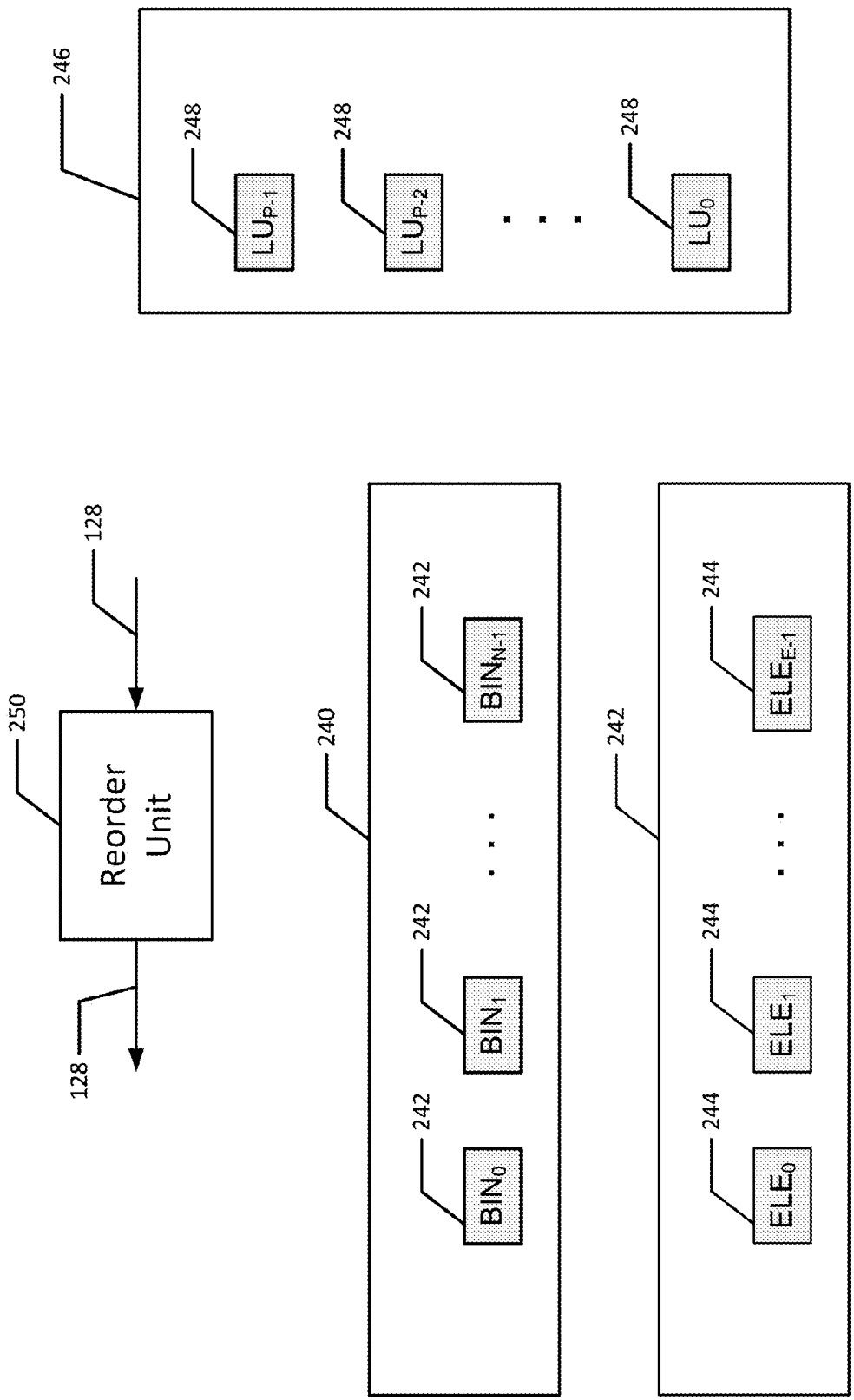

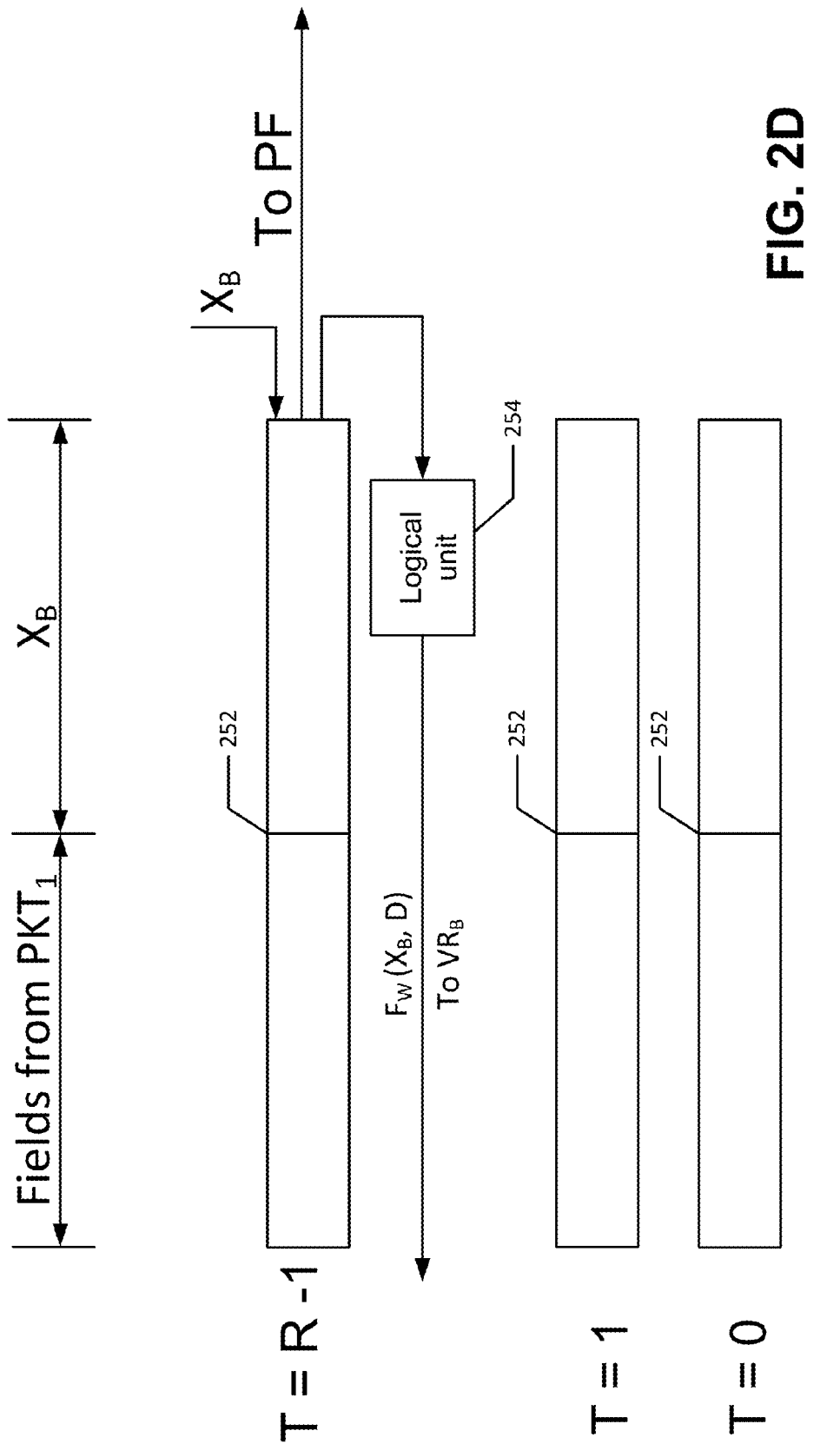

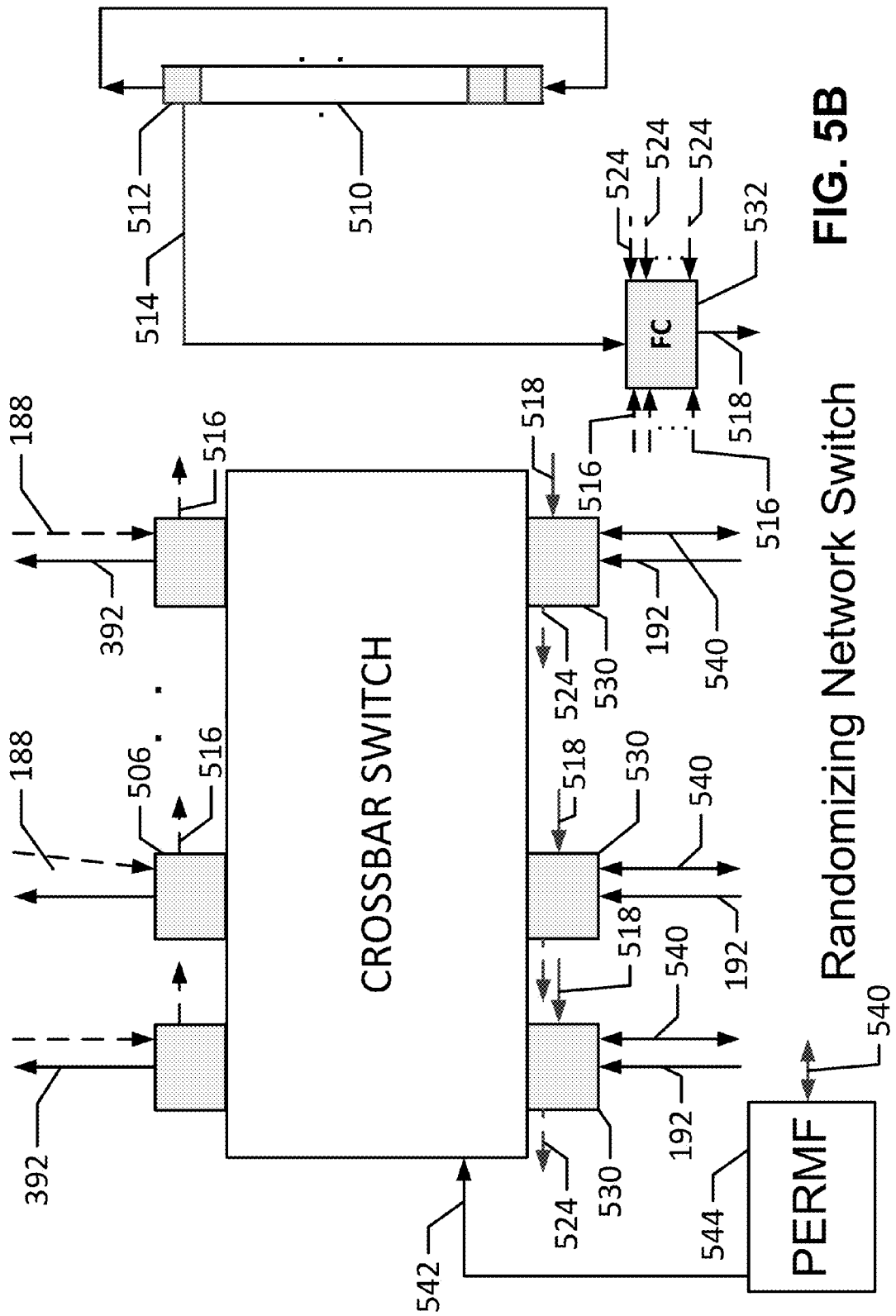
FIG. 5B Randomizing Network Switch

US 9,253,248 B2

PARALLEL INFORMATION SYSTEM UTILIZING FLOW CONTROL AND VIRTUAL CHANNELS

CROSS-REFERENCE TO RELATED PATENTS

The disclosed system and operating method are related to subject matter disclosed in the following patents and patent applications that are incorporated by reference herein in their entirety:

U.S. Pat. No. 5,996,020 entitled, "A Multiple Level Minimum Logic Network", naming Coke S. Reed as inventor;

U.S. Pat. No. 6,289,021 entitled, "A Saleable Low Latency Switch for Usage in an Interconnect Structure", naming John Hesse as inventor;

U.S. Pat. No. 6,754,207 entitled, "Multiple Path Wormhole Interconnect", naming John Hesse as inventor;

U.S. patent application Ser. No. 11/925,546 entitled, "Network Interface Device for Use in Parallel Computing Systems," naming Coke Reed as inventor.

BACKGROUND

Nodes of parallel computing systems are connected by an interconnect subsystem comprising a network and network interface components. In case the parallel processing elements are located in nodes (in some cases referred to as computing blades) the blades contain a network interface card (in some cases the interface is not on a separate card). An operating system is chosen in part based on the characteristics of the network. Network Interface Controllers (NICs) are designed to attain the best possible performance given the characteristics of the processors, the processor interface protocol, the network, and the operating system.

SUMMARY

Embodiments of a data handling apparatus can comprise a network interface controller configured to interface a processing node to a network. The network interface controller can comprise a network interface, a register interface, a processing node interface, and logic. The network interface can comprise a plurality of lines coupled to the network for communicating data on the network. The register interface can comprise a plurality of lines coupled to a plurality of registers. The processing node interface can comprise at least one line coupled to the processing node for communicating data with a local processor local to the processing node wherein the local processor can be configured to read data to and write data from the plurality of registers. The logic is configured to receive packets comprising a header and a payload from the network and further configured to insert the packets into ones of the plurality of registers as indicated by the header.

BRIEF DESCRIPTION OF THE DRAWINGS

Embodiments of the invention relating to both structure and method of operation may best be understood by referring to the following description and accompanying drawings:

FIG. 2B illustrates an embodiment of a lookup first-in, first-out buffer (FIFO) that can be used in the process of accessing remote vortex registers;

FIG. 2C illustrates an embodiment of a packet reorder device that can be used in a first embodiment of atomic processing;

FIG. 2D illustrates an embodiment of a lookup FIFO that can be used in a read-modify-write operation using the first embodiment of atomic operation;

FIG. 5B illustrates an embodiment of a network randomizer switch.

DETAILED DESCRIPTION

Figure 1A:
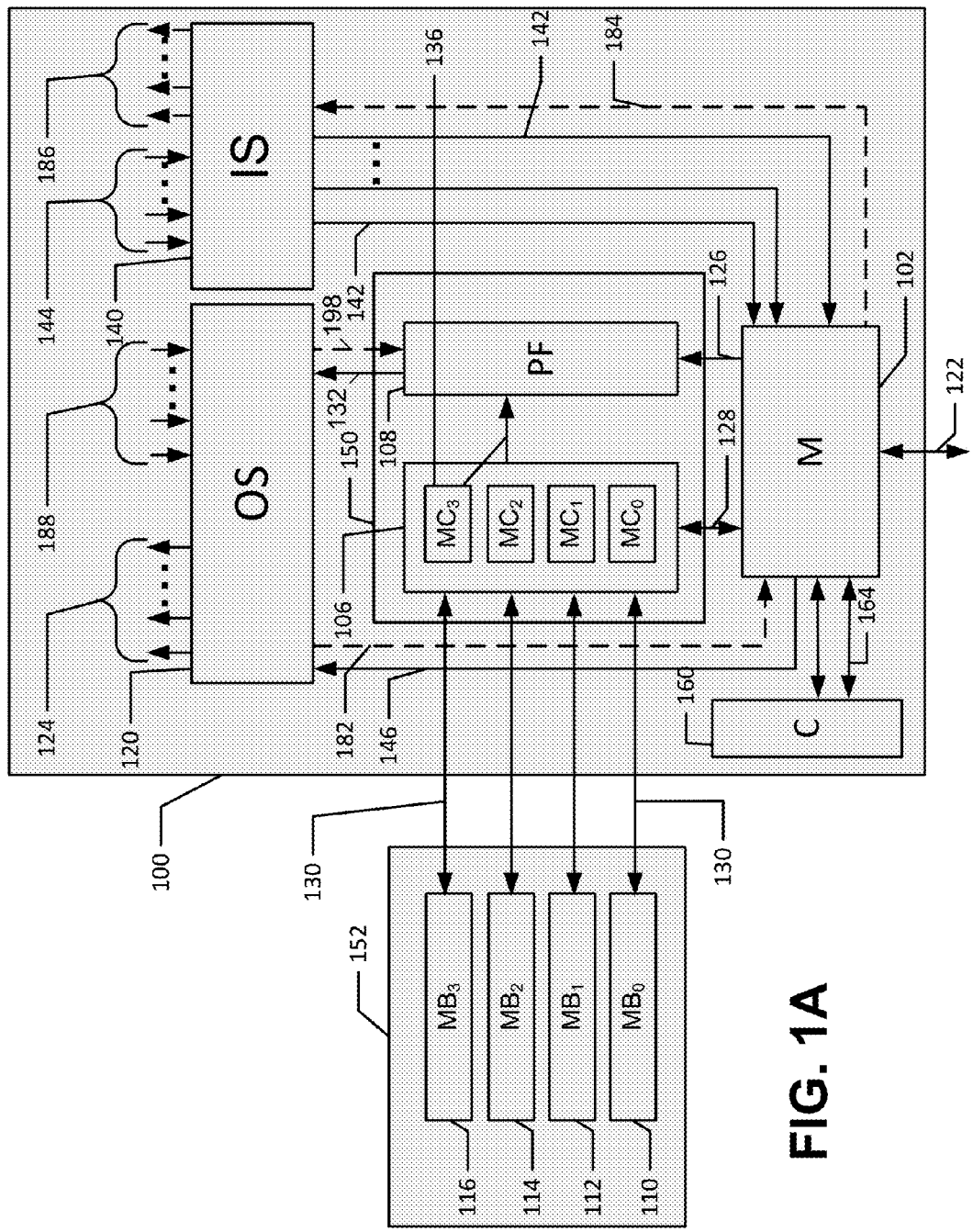
FIG. 1A illustrates an embodiment of a partially populated network interface controller (NIC) and a portion of the off-circuit static random access memory (SRAM) vortex register memory components.

Embodiments of a parallel processing and communication system comprise a number of computing and communication nodes interconnected by a network including a means and method for interfacing the processing and communication nodes to the network system. Embodiments of the system can also perform a method of switch-to-switch flow in the network.

U.S. patent application Ser. No. 11/925,546 describes an efficient method of interfacing the network to the processor, which is improved in several aspects by the system disclosed herein. In a system that includes a collection of processors and a network connecting the processors, efficient system operation depends upon a low-latency-high-bandwidth processor to network interface. U.S. patent application Ser. No. 11/925,546 describes an extremely low latency processor to network interface. The system disclosed herein further reduces the processor to network interface latency. A collection of network interface system working registers, referred to herein as vortex registers, facilitate improvements in the system design. The system disclosed herein enables logical and arithmetical operations that can be performed in these registers without the aid of the system processors. Another aspect of the disclosed system is that the number of vortex registers has been greatly increased and the number and scope of logical operations that can be performed in these registers, without resorting to the system processors, is expanded.

The disclosed system enables several aspects of improvement. A first aspect of improvement is to reduce latency by a technique that combines header information stored in the NIC vortex registers with payloads from the system processors to form packets and then inserting these packets into the central network without ever storing the payload section of the packet in the NIC. A second aspect of improvement is to reduce latency by a technique that combines payloads stored in the NIC vortex registers with header information from the system processors to form packets and then inserting these packets into the central network without ever storing the header section of the packet in the NIC. The two techniques lower latency and increase the useful information in the vortex registers. In U.S. patent application Ser. No. 11/925,546, a large collection of arithmetic and logical units are associated with the vortex registers. In U.S. patent application Ser. No. 11/925,546, the vortex registers can be custom working registers on the chip. The system disclosed herein uses random access memory (SRAM or DRAM) for the vortex registers with a set of logical units associated with each bank of memory, enabling the NIC of the disclosed system to contain more vortex registers than the NIC described in U.S. patent application Ser. No. 11/925,546, thereby allowing fewer logical units to be employed. Therefore, the complexity of each of the logical units can be greatly expanded to include such functions as floating point operations. The extensive list of such program in memory (PIM) operations includes atomic read-modify-write operations enabling, among other things, efficient program control. Another aspect of the system disclosed herein is a new command that creates two copies of certain critical packets and sends the copies through separate independent networks. For many applications, this feature squares the probability of the occurrence of a non-correctable error. A system of counters and flags enables the higher level software to guarantee a new method of eliminating the occurrence of non-correctable errors in other data transfer operations. Another aspect of the disclosed system enables multiple physical or virtual channels to guarantee for non-blocking operation for packets that are inserted into the network without the use of the system processor at the transmitting NIC.

An Overview of NIC Hardware

FIG. 1A illustrates components of a Network Interface Controller (NIC) 100 and associated memory banks 152 which can be vortex memory banks formed of data vortex registers. The NIC communicates with a processor local to the NIC and also with Dynamic Random Access Memory (DRAM) through link 122. In some embodiments, link 122 can be a HyperTransport link, in other embodiments, link 122 can be a Peripheral Component Interconnect (PCI) express link. Other suitable links can also be used. The NIC can transfer data packets to central network switches through lines 124. The NIC receives data packets from central network switches through lines 144. Control information is passed on lines 182, 184, 186, and 188. An output switch 120 scatters packets across a plurality of network switches (not shown). An input switch 140 gathers packets from a plurality of network switches (not shown). The input switch then routes the incoming packets into bins in the traffic management module M 102. The processor (not shown) that is connected to NIC 100 is capable of sending and receiving data through line 122. The vortex registers introduced in U.S. patent application Ser. No. 11/925,546 and discussed in detail in the present disclosure are stored in Static Random Access Memory (SRAM) or in some embodiments DRAM. The SRAM vortex memory banks are connected to NIC 100 by lines 130. Unit 106 is a memory controller logic unit (MCLU) and can contain: 1) a plurality of memory controller units; 2) logic to control the flow of data between the memory controllers and the packet-former PF 108; and 3) processing units to perform atomic operations. A plurality of memory controllers located in unit 106 controls the data transfer between the packet-former 108 in the NIC and the SRAM vortex memory banks 152. In case a processor PROC is connected to a particular NIC 100 and an SRAM memory bank containing a vortex register VR is also connected to the NIC 100, the vortex register can be defined as and termed a Local Vortex Register of the processor PROC. In case vortex register VR is in an SRAM connected to a NIC that is not connected to the given processor PROC, then vortex register VR can be defined as and termed a Remote Vortex Register of processor PROC. The packet-forming module PF 108 forms a packet by either: 1) joining a header stored in the vortex register memory bank 152 with a payload sent to PF from a processor through link 122 or; 2) joining a payload stored in the vortex register memory bank with a header sent to packet-forming module PF from the processor through links 122 and 126. A useful aspect of the disclosed system is the capability for simultaneous transfer of packets between the NIC 100 and a plurality of remote NICs. These transfers are divided into transfer groups. A collection of counters in a module C 160 keep track of the number of packets in each transfer group that enter the vortex registers in SRAM 152 from remote NICs. The local processor is capable of examining the contents of the counters in module C to determine when NIC 100 has received all of the packets associated with a particular transfer. In addition to forming packets in unit 150, in some embodiments the packets can be formed in the processor and sent to the output switch through line 146.

Figure 1B:
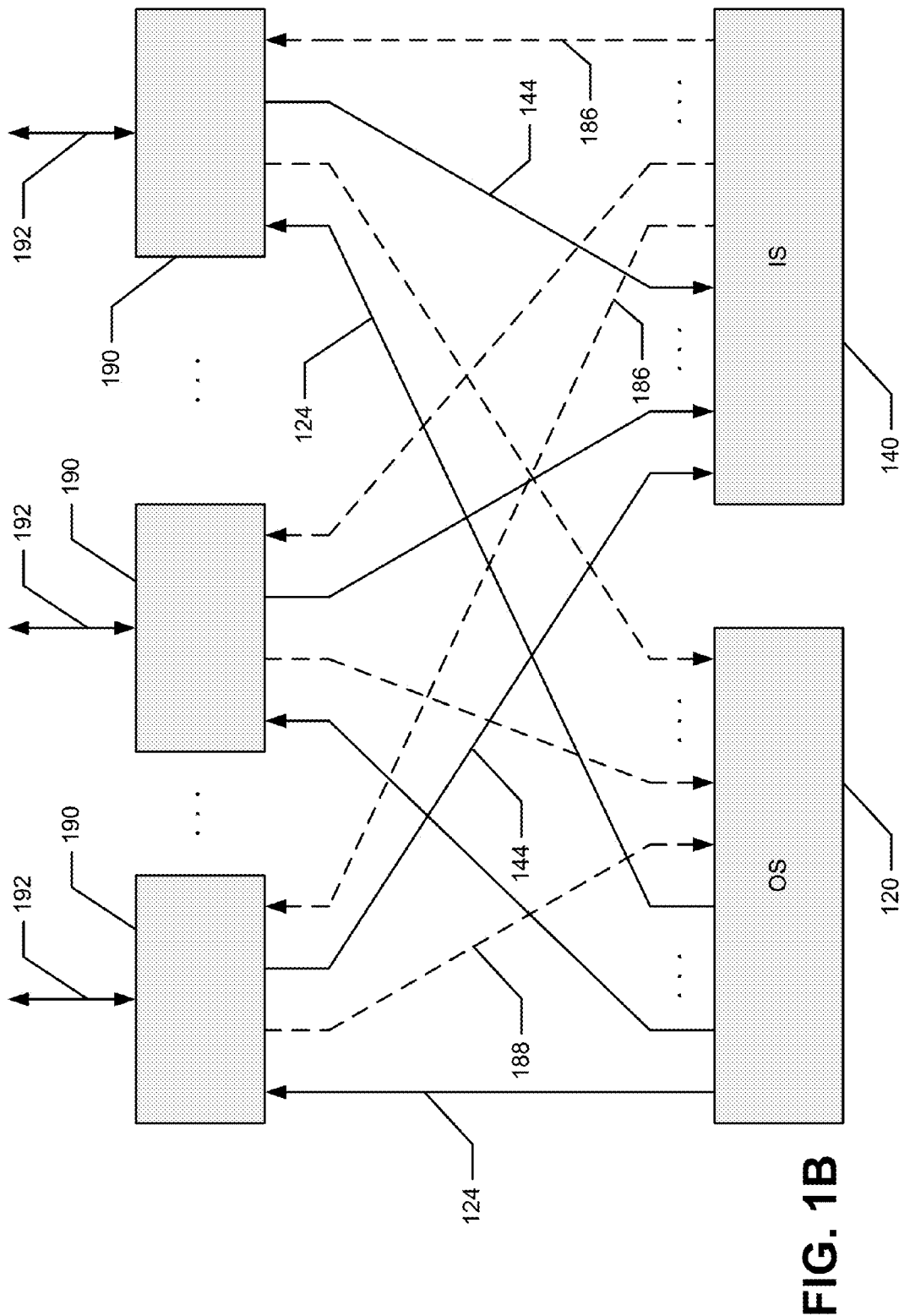
FIG. 1B illustrates an embodiment of NIC input/output units.
Figure 1C:
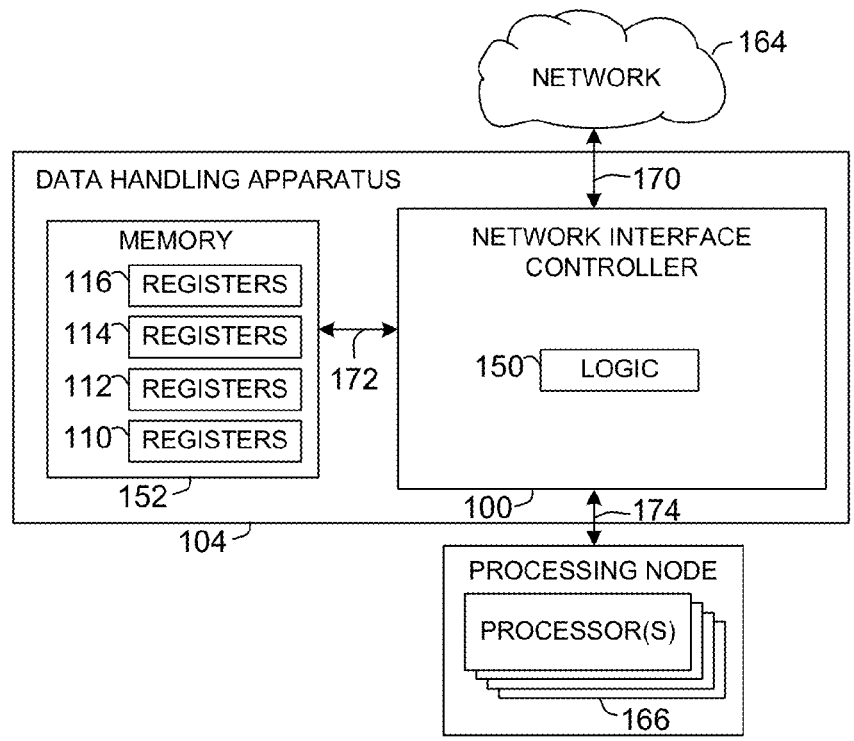
FIGS. 1C and 1D are schematic block diagrams depicting example embodiments of a data handling apparatus.

In an illustrative embodiment, as shown in FIGS. 1A and 1C, a data handling apparatus 104 can comprise a network interface controller 100 configured to interface a processing node 162 to a network 164. The network interface controller 100 can comprise a network interface 170, a register interface 172, a processing node interface 174, and logic 150. The network interface 170 can comprise a plurality of lines 124, 188, 144, and 186 coupled to the network for communicating data on the network 164. The register interface 172 can comprise a plurality of lines 130 coupled to a plurality of registers 110, 112, 114, and 116. The processing node interface 174 can comprise at least one line 122 coupled to the processing node 162 for communicating data with a local processor local to the processing node 162 wherein the local processor 166 can be configured to read data to and write data from the plurality of registers 110, 112, 114, and 116. The logic 150 configured to receive packets comprising a header and a payload from the network 164 and further configured to insert the packets into ones of the plurality of registers 110, 112, 114, and 116 as indicated by the header.

In various embodiments, the network interface 170, the register interface 172, and the processing node interface 174 can take any suitable forms, whether interconnect lines, wireless signal connections, optical connections, or any other suitable communication technique.

Figure 1D:
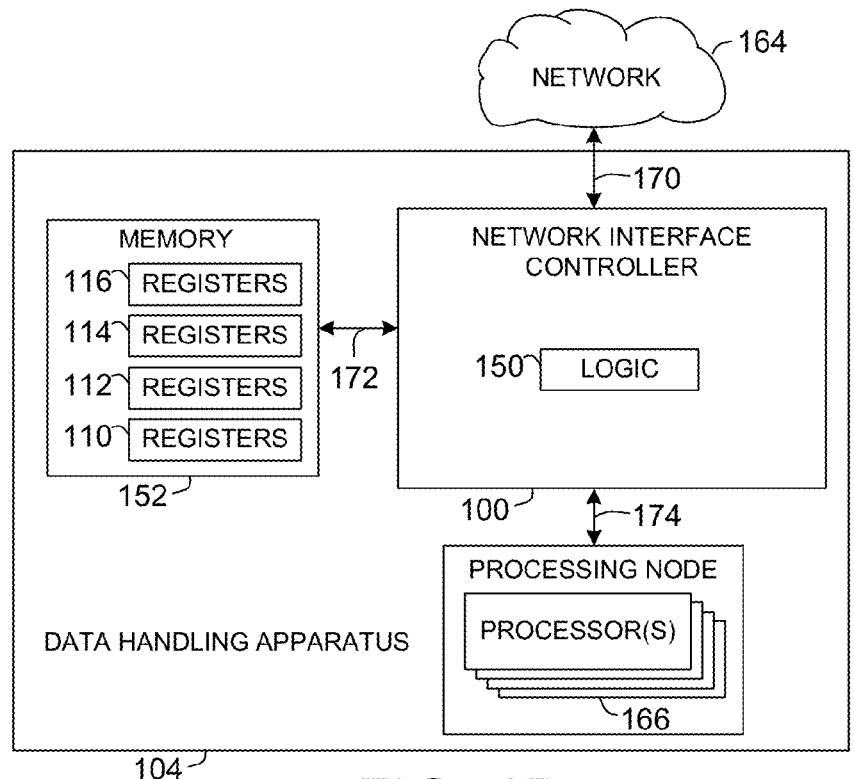

In some embodiments, as shown in combination in FIGS. 1A and 1D, the data handling apparatus 104 can also comprise a processing node 162 and one or more processors 166.

In some embodiments and/or applications, an entire computer can be configured to use a commodity network (such as Infiniband or Ethernet) to connect among all of the processing nodes and/or processors. Another connection can be made between the processors by communicating through a Data Vortex network formed by network interconnect controllers NICs 100 and vortex registers. Thus, a programmer can use standard Message Passing Interface (MPI) programming without using any Data Vortex hardware and use the Data Vortex Network to accelerate more intensive processing loops. The processors can access mass storage through the Infiniband network, reserving the Data Vortex Network for the fine-grained parallel communication that is highly useful for solving difficult problems.

In some embodiments, a data handling apparatus 104 can comprise a network interface controller 100 configured to interface a processing node 162 to a network 164. The network interface controller 100 can comprise a network interface 170, a register interface 172, a processing node interface 174, and a packet-former 108. The network interface 170 can comprise a plurality of lines 124, 188, 144, and 186 coupled to the network for communicating data on the network 164. The register interface 170 can comprise a plurality of lines 130 coupled to a plurality of registers 110, 112, 114, and 116. The processing node interface 174 can comprise at least one line 122 coupled to the processing node 162 for communicating data with a local processor local to the processing node 162 wherein the local processor can be configured to read data to and write data from the plurality of registers 110, 112, 114, and 116. The packet-former 108 can be configured form packets comprising a header and a payload. The packet-former 108 can be configured to use data from the plurality of registers 110, 112, 114, and 116 to form the header and to use data from the local processor to form the payload, and configured to insert formed packets onto the network 164.

In some embodiments and/or applications, the packet-former 108 configured form packets comprising a header and a payload such that the packet-former 108 uses data from the local processor to form the header and uses data from the plurality of registers 110, 112, 114, and 116 to form the payload. The packet-former 108 can be further configured to insert the formed packets onto the network 164.

The network interface controller 100 can be configured to simultaneously transfer a plurality of packet transfer groups.

Referring to FIG. 1B, the apparatus 190 for connecting the NIC input switch 140 and NIC output switch 120 to a high speed bidirectional link is depicted. The apparatus 190 also has logic for performing a method of merging data on link 124 with control data on link 186 and also a method of separating data on link 192 into control link 188 and data link 144.

Packet types

At least two classes of packets can be specified for usage by the illustrative NIC system 100. A first class of packets (CPAK packets) can be used to transfer data between the processor and the NIC. A second class of packets (VPAK packets) can be used to transfer data between vortex registers.

Figure 2A:
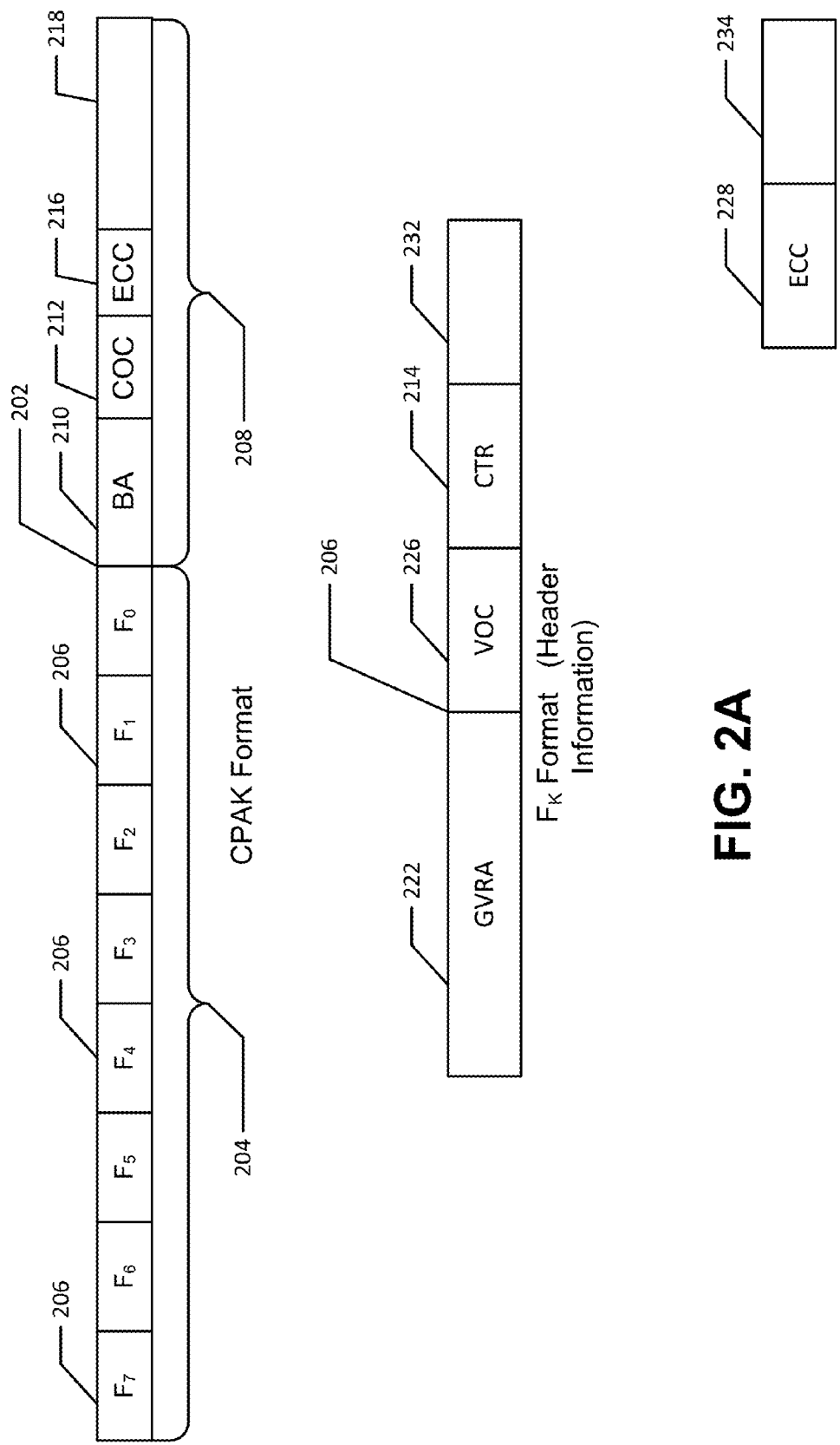
FIG. 2A illustrates an embodiment of formats of two types of packets: 1) a CPAK packet with a 64-byte payload and; 2) a VPAK packet with a 64 bit payload.

Referring to FIG. 2A, embodiments of packet formats are illustrated. The CPAK packet 202 has a payload 204 and a header 208. The payload length of the CPAK packet is predetermined to be a length that the processor uses in communication. In many commodity processors, the length of the CPAK payload is the cache line length. Accordingly, the CPAK packet 202 contains a cache line of data. In illustrative embodiments, the cache line payload of CPAK can contain 64 bytes of data. The payload of such a packet can be divided into eight data fields 206 denoted by $F_0, F_1, \ldots, F_7$. The header contains a base address field BA 210 containing the address of the vortex register designated to be involved with the CPAK packet 202. The header field contains an operation code COC 212 designating the function of the packet. The field CTR 214 is reserved to identify a counter that is used to keep track of packets that arrive in a given transfer. The use of the CTR field is described hereinafter. A field ECC 216 contains error correction information for the packet. In some embodiments, the ECC field can contain separate error correction bits for the payload and the header. The remainder of the bits in the header are in a field 218 that is reserved for additional information. In one useful aspect of the CPAK packet functionality, each of the data fields can contain the payload of a VPAK packet. In another useful aspect of the CPAK packet functionality, each of the data fields $F_K$ can contain a portion of the header information of a VPAK packet. When data field $F_K$ is used to carry VPAK header information, $F_K$ has a header information format 206 as illustrated in FIG. 2A. A GVRA field 222 contains the global address of a vortex register that can be either local or remote. The vortex packet OP code denoted by VOC is stored in field 226. A CTR field 214 identifies the counter that can be used to monitor the arrival of packets in a particular transfer group. Other bits in the packet can be included in field 232. In some embodiments, the field 232 bits are set to zero.

Accordingly, referring to FIGS. 1A and 1B in combination with FIG. 2A, the data handling apparatus 104 can further comprise the local processor (not shown) local to the processing node 162 coupled to the network interface controller 100 via the processing node interface 174. The local processor can be configured to send a packet CPAK 202 of a first class to the network interface controller 100 for storage in the plurality of registers wherein the packet CPAK comprises a plurality of K fields $F_0, F_1, \ldots F_{K-1}$. Fields of the plurality of K fields $F_0, F_1, \ldots F_{K-1}$ can comprise a global address GVRA of a remote register, an operation code VOC, and a counter CTR 214 configured to be decremented in response to arrival of a packet at a network interface controller 100 that is local to the remote register identified by the global address GVRA. The first class of packets CPAK 202 specifies usage for transferring data between the local processor and the network interface controller 100.

In some embodiments, one or more of the plurality of K fields $F_0, F_1, \ldots F_{K-1}$ can further comprise an error correction information ECC 216.

In further embodiments, the packet CPAK 202 can further comprise a header 208 which includes an operation code COC 212 indicative of whether the plurality of K fields $F_0, F_1, \ldots F_{K-1}$ are to be held locally in the plurality of registers coupled to the network interface controller 100 via the register interface 172.

In various embodiments, the packet CPAK 202 can further comprise a header 208 which includes a base address BA indicative of whether the plurality of K fields $F_0, F_1 \ldots F_{K-1}$ are to be held locally at ones of the plurality of registers coupled to the network interface controller 100 via the register interface 172 at addresses BA, BA+1, BA+K−1.

Furthermore, the packet CPAK 202 can further comprise a header 208 which includes error correction information ECC 216.

In some embodiments, the data handling apparatus 104 can further comprise the local processor which is local to the processing node 162 coupled to the network interface controller 100 via the processing node interface 174. The local processor can be configured to send a packet CPAK 202 of a first class to the network interface controller 100 via the processing node interface 174 wherein the packet CPAK 202 can comprise a plurality of K fields $G_0, G_1, \ldots G_{K-1}$, a base address BA, an operation code COC 212, and error correction information ECC 216.

The operation code COC 212 is indicative of whether the plurality of K fields $G_0, G_1, \ldots G_{K-1}$ are payloads 204 of packets wherein the packet-former 108 forms K packets. The individual packets include a payload 204 and a header 208. The header 208 can include information for routing the payload 204 to a register at a predetermined address.

The second type of packet in the system is the vortex packet. The format of a vortex packet VPAK 230 is illustrated in FIG. 2A. In the illustrative example, the payload 220 of a VPAK packet contains 64 bits of data. In other embodiments, payloads of different sizes can be used. In addition to the global vortex register address field GVRA 222 and the vortex OP code field 226, the header also contains the local NIC address LNA 224 an error correction code ECC 228 and a field 234 reserved for additional bits. The field CTR 214 identifies the counter to be used to monitor the arrival of vortex packets that are in the same transfer group as packet 230 and arrive at the same NIC as 230. In some embodiments, the field can be set to all zeros.

The processor uses CPAK packets to communicate with the NIC through link 122. VPAK packets exit NIC 100 through lines 124 and enter NIC 100 through lines 144. The NIC operation can be described in terms of the use of the two types of packets. For CPAK packets, the NIC performs tasks in response to receiving CPAK packets. The CPAK packet can be used in at least three ways including: 1) loading the local vortex registers; 2) scattering data by creating and sending a plurality of VPAK packets from the local NIC to a plurality of NICs that can be either local or remote; and; 3) reading the local vortex registers.

Thus, referring to FIGS. 1A and 1B in combination with FIG. 2A, the logic 150 can be configured to receive a packet VPAK 230 from the network 164, perform error correction on the packet VPAK 230, and store the error-corrected packet VPAK 230 in a register of the plurality of registers 110, 112, 114, and 116 specified by a global address GVRA 222 in the header 208.

In some embodiments, the data handling apparatus 104 can be configured wherein the packet-former 108 is configured to form a plurality K of packets VPAK 230 of a second type $P_0, P_1, \ldots, P_{K-1}$ such that for an index W. A packet $P_W$ includes a payload $G_W$ and a header containing a global address GVRA 222 of a target register, a local address LNA 224 of the network interface controller 100, a packet operation code 226, a counter CTR 214 that identifies a counter to be decremented upon arrival of the packet $P_W$, and error correction code ECC 228 that is formed by the packet-former 108 when the plurality K of packets VPAK 230 of the second type have arrived.

In various embodiments, the data handling apparatus 104 can comprise the local processor 166 local to the processing node 162 which is coupled to the network interface controller 100 via the processing node interface 174. The local processor 166 can be configured to receive a packet VPAK 230 of a second class from the network interface controller 100 via the processing node interface 162. The network interface controller 100 can be operable to transfer the packet VPAK 230 to a cache of the local processor 166 as a CPAK payload and to transform the packet VPAK 230 to memory in the local processor 166.

Thus, processing nodes 162 can communicate CPAK packets in and out of the network interface controller NIC 100 and the NIC vortex registers 110, 112, 114, and 116 can exchange data in VPAK packets 230.

The network interface controller 100 can further comprise an output switch 120 and logic 150 configured to send the plurality K of packets VPAK of the second type $P_0, P_1, \ldots, P_{K-1}$ through the output switch 120 into the network 164.

Loading the Local Vortex Register Memories

The loading of a cache line into eight Local Vortex Registers can be accomplished by using a CPAK to carry the data in a memory-mapped I/O transfer. The header of CPAK contains an address for the packet. A portion of the bits of the address (the BA field 210) corresponds to a physical base address of vortex registers on the local NIC. A portion of the bits correspond to an operation code (OP code) COC 212. The header can also contain an error correction field 216. Therefore, from the perspective of the processor, the header of a CPAK packet is a target address. From the perspective of the NIC, the header of a CPAK packet includes a number of fields with the BA field being the physical address of a local vortex register and the other fields containing additional information. In an illustrative embodiment, the CPAK operation code (COC 212) set to zero signifies a store in local registers. In an another aspect of an illustrative embodiment, four banks of packet header vortex register memory banks are illustrated. In other embodiments, a different number of SRAM banks may be employed. In an illustrative embodiment, the vortex addresses $VR_0, VR_1, \ldots, VR_{NMAX-1}$ are striped across the banks so that $VIR_0$ is in $MB_0$ 110, $VR_1$ is in $MB_1$ 112, $VR_2$ is in $MB_2$ 114, $VR_3$ is in $MB_3$ 116, $VR_4$ is in $MB_0$ and so forth. To store the sequence of eight 64 bit values in addresses $VR_N, VR_{N+1}, \ldots, VR_{N+7}$, a processor sends the cache line as a payload in a packet CPAK to the NIC. The header of CPAK contains the address of the vortex register $VR_N$ along with additional bits that govern the operation of the NIC. In case CPAK has a header which contains the address of a local vortex register memory along with an operation code (COC) field set to 0 (the "store operation" code in one embodiment), the payload of CPAK is stored in Local Vortex Register SRAM memory banks.

Hence, referring to FIGS. 1A and 1B in combination with FIG. 2A, the local processor which is local to the processing node 162 can be configured to send a cache line of data locally to the plurality of registers coupled to the network interface controller 100 via the register interface 172.

In some embodiments, the cache line of data can comprise a plurality of elements $F_0, F_1, \ldots F_N$.

CPAK has a header base address field BA which contains the base address of the vortex registers to store the packet. In a simple embodiment, a packet with BA set to N is stored in vortex memory locations $V_N, V_{N+1}, \ldots, V_{N+7}$. In a more general embodiment a packet can be stored in J vortex memory locations $V_{[AN]}, V_{[AN+B]}, V_{[AN+2B]}, \ldots, V_{[AN+(J-1)B]}$. With A, B, and J being passed in the field 218.

The processor sends CPAK through line 122 to a packet management unit M 102. Responsive to the OC field set to "store operation", M directs CPAK through line 128 to the memory controller MCLU 106. In FIG. 1A, a single memory controller is associated with each memory bank. In other applications, a memory controller can be associated with multiple SRAM banks.

In other embodiments, additional op code fields can store a subset of the cache line in prescribed strides in the vortex memories. A wide range of variations to the operations described herein can be employed.

Reading the Local Vortex Registers

The processor reads a cache line of data from the Local Vortex Registers $V_N, V_{N+1}, \ldots, V_{N+7}$ by sending a request through line 122 to read the proper cache line. The form of the request depends upon the processor and the format of link 122. The processor can also initiate a direct memory access function DMA that transfers a cache line of data directly to DRAM local to the processor. The engine (not illustrated in FIG. 1A) that performs the DMA can be located in MCLU 106.

Scattering Data Across the System Using Addresses Stored in Vortex Registers

Some embodiments can implement a practical method for processors to scatter data packets across the system. The techniques enable processors and NICs to perform large corner-turns and other sophisticated data movements such as bit-reversal. After setup, these operations can be performed without the aid of the processors. In a basic illustrative operation, a processor PROC sends a cache line CL including, for example, the eight 64-bit words $D_0, D_1, \ldots, D_7$ to eight different global addresses $A_{N0}, A_{N1}, \ldots, A_{N7}$ stored in the Local Vortex Registers $V_N, V_{N+1}, \ldots, V_{N+7}$. In other embodiments, the number of words may not be eight and the word length may not be 64 bits. The eight global addresses can be in locations scattered across the entire range of vortex registers. Processor PROC sends a packet CPAK 202 with a header containing an operation code field, COC 212, (which can be set to 1 in the present embodiment) indicating that the cache line contains eight payloads to be scattered across the system in accordance with eight remote addresses stored in Local Vortex Registers. CPAK has a header base address field BA which contains the base address of $V_N$. In a first case, processor PROC manufactures cache line CL. In a second case, processor PROC receives cache line CL from DRAM local to the processor PROC. In an example embodiment, the module M can send the payload of CPAK and the COC field of CPAK down line 126 to the packet-former PF 108 and can send the vortex address contained in the header of VPAK down line 128 to the memory controller system. The memory controller system 106 obtains eight headers from the vortex register memory banks and sends these eight 64 bit words to the packet-former PF 108. Hardware timing coordinates the sending of the payloads on line 126 and headers on line 136 so that the two halves of the packet arrive at the packet-former at the same time. In response to a setting of 1 for the operation code COC, the packet-former creates eight packets using the VPAK format illustrated in FIG. 2A. The field Payload 220 is sent to the packet-former PF 108 in the CPAK packet format. The fields GVRA 222 and VOC 226 are transferred from the vortex memory banks through lines 130 and 136 to the packet-former PF. The local NIC address field (LNA field) 224 is unique to NIC 100 and is stored in the packet-former PF 108. The field CTR 214 can be stored in the $F_K$ field in $V_K$. When the fields of the packet are assembled, the packet-former PF 108 builds the error correction field ECC 228.

In another example embodiment, functionality is not dependent on synchronizing the timing of the arrival of the header and the payload by packet management unit M. Several operations can be performed. For example, processor PROC can send VPAK on line 122 to packet management unit M 102. In response to the operation code OC value of 1, packet management unit M sends cache line CL down line 126 to the packet-former, PF 108. Packet-former PF can request the sequence $V_N, V_{N+1}, \ldots, V_{N+7}$ by sending a request signal RS from the packet-former to the memory controller logic unit MCLU 106. The request signal RS travels through a line not illustrated in FIG. 1A. In response to request signal RS, memory controller MC accesses the SRAM banks and returns the sequence $V_N, V_{N+1}, \ldots, V_{N+7}$ to PF. Packet-former PF sends the sequence of packets $(V_N, D_0), (V_{N+1}, D_1), (V_{N+7}, D_7)$ down line 132 to the output switch OS 120. The output switch then scatters the eight packets across eight switches in the collection of central switches. FIG. 1A shows a separate input switch 140 and output switch 120. In other embodiments these switches can be combined to form a single switch.

Scattering Data Across the System Using Payloads Stored in Vortex Registers

Another method for scattering data is for the system processor to send a CPAK with a payload containing eight headers through line 122 and the address ADR of a cache line of payloads in the vortex registers. The headers and payloads are combined and sent out of the NIC on line 124. In one embodiment, the OP code for this transfer is 2. The packet management unit M 102 and the packet-former PF 108 operate as before to unite header and payload to form a packet. The packet is then sent on line 132 to the output switch 120.

Sending Data Directly to a Remote Processor

A particular NIC can contain an input first-in-first-out buffer (FIFO) located in packet management unit M 102 that is used to receive packets from remote processors. The input FIFO can have a special address. Remote processors can send to the address in the same manner that data is sent to remote vortex registers. Hardware can enable a processor to send a packet VPAK to a remote processor without pre-arranging the transfer. The FIFO receives data in the form of 64-bit VPAK payloads. The data is removed from the FIFO in 64-byte CPAK payloads. In some embodiments, multiple FIFOs are employed to support quality-of-service (QoS) transfers. The method enables one processor to send a "surprise packet" to a remote processor. The surprise packets can be used for program control. One useful purpose of the packets is to arrange for transfer of a plurality of packets from a sending processor S to a receiving processor R. The setting up of a transfer of a specified number of packets from S to R can be accomplished as follows. Processor S can send a surprise packet to processor R requesting that processor R designates a block of vortex registers to receive the specified number of packets. The surprise packet also requests that processor R initializes specified counters and flags used to keep track of the transfer. Details of the counters and flags are disclosed hereinafter.

Accordingly, referring to FIGS. 1A and 1B, the network interface controller 100 can further comprise a first-in first-out (FIFO) input device in the packet management unit M 102 such that a packet with a header specifying a special GVRA address causes the packet to be sent to the FIFO input device and the FIFO input device transfers the packet directly to a remote processor specified by the GVRA address.

Packets Assembled by the Processor

Sending VPAK packets without using the packet-former can be accomplished by sending a CPAK packet P from the processor to the packet management unit M with a header that contains an OP code indicating whether the VPAK packets in the payload are to be sent to local or remote memory. In one embodiment, the header can also set one of the counters in the counter memory C. By this procedure, a processor that updates Local Vortex Registers has a method of determining when that process has completed. In case the VPAK packets are sent to remote memory, the packet management unit M can route the said packets through line 146 to the output switch OS.

Gathering the Data

In the following, a "transfer group" can be defined to include a selected plurality of packet transfers. Multiple transfer groups can be active at a specified time. An integer N can be associated with a transfer group, so that the transfer group can be specified as "transfer group N." A NIC can include hardware to facilitate the movement of packets in a given transfer group. The hardware can include a collection of flags and counters ("transfer group counters" or "group counters").

Hence, referring to FIGS. 1A and 1B in combination with FIG. 2, the network interface controller 100 can further comprise a plurality of group counters 160 including a group with a label CTR that is initialized to a number of packets to be transferred to the network interface controller 100 in a group A.

In some embodiments, the network interface controller 100 can further comprise a plurality of flags wherein the plurality of flags are respectively associated with the plurality of group counters 160. A flag associated with the group with a label CTR can be initialized to zero the number of packets to be transferred in the group of packets.

In various embodiments and/or applications, the plurality of flags can be distributed in a plurality of storage locations in the network interface controller 100 to enable a plurality of flags to be read simultaneously.

In some embodiments, the network interface controller 100 can further comprise a plurality of cache lines that contain the plurality of flags.

The sending and receiving of data in a given transfer group can be illustrated by an example. In the illustrative example, each node can have 512 counters and 1024 flags. Each counter can have two associated flags including a completion flag and an exception flag. In other example configurations, the number of flags and counters can have different values. The number of counters can be an integral multiple of the number of bits in a processor's cache line in an efficient arrangement.

Using an example notation, the Data Vortex® computing and communication device can contain a total of K NICs denoted by $NIC_0$, $NIC_1$, $NIC_2$, . . . , $NIC_{K-1}$. A particular transfer can involve a plurality of packet-sending NICs and also a plurality of packet-receiving NICs. In some examples, a particular NIC can be both a sending NIC and also a receiving NIC. Each of the NICS can contain the transfer group counters $TGC_0$, $TGC_1$, . . . , $TGC_{511}$. The transfer group counters can be located in the counter unit C 160. The timing of counter unit C can be such that the counters are updated after the memory bank update has occurred. In the illustrative example, $NIC_J$ associated with processor $PROC_J$ can be involved in a number of transfer groups including the transfer group $TG_L$. In transfer group $TG_L$, $NIC_J$ receives NPAK packets into pre-assigned vortex registers. The transfer group counter $TGC_M$ on $NIC_J$ can be used to track the packets received by $NIC_J$ in $TG_L$. Prior to the transfer: 1) $TGC_M$ is initialized to NPAK−1; 2) the completion flag associated with $TGC_M$ is set to zero; and 3) the exception flag associated with $TGC_M$ is set to zero. Each packet contains a header and a payload. The header contains a field CTR that identifies the transfer group counter number CN to be used by $NIC_J$ to track the packets of $TG_L$ arriving at $NIC_J$. A packet PKT destined to be placed in a given vortex register VR in $NIC_J$ enters error correction hardware. In an example embodiment, the error correction for the header can be separate from the error correction for the payload. In case of the occurrence of a correctable error in PKT, the error is corrected. If no uncorrectable errors are contained in PKT, then the payload of PKT is stored in vector register VR and $TGC_{CN}$ is decremented by one. Each time $TGC_{CN}$ is updated, logic associated with $TGC_{CN}$ checks the status of $TGC_{CN}$. When $TGC_M$ is negative, then the transfer of packets in $TG_L$ is complete. In response to a negative value in $TGC_{CN}$, the completion flag associated with $TGC_{CN}$ is set to one.

Accordingly, the network interface controller 100 can further comprise a plurality of group counters 160 including a group with a label CTR that is initialized to a number of packets to be transferred to the network interface controller 100 in a group A. The logic 150 can be configured to receive a packet VPAK from the network 164, perform error correction on the packet VPAK, store the error-corrected packet VPAK in a register of the plurality of registers 110, 112, 114, and 116 as specified by a global address GVRA in the header, and decrement the group with the label CTR.

In some embodiments, the network interface controller 100 can further comprise a plurality of flags wherein the plurality of flags are respectively associated with the plurality of group counters 160. A flag associated with the group with a label CTR can be initialized to zero the number of packets to be transferred in the group of packets. The logic 150 can be configured to set the flag associated with the group with the label CTR to one when the group with the label CTR is decremented to zero.

The data handling application 104 can further comprise the local processor local to the processing node 162 coupled to the network interface controller 100 via the processing node interface 174. The local processor can be configured to determine whether the flag associated with the group with the label CTR is set to one and, if so, to indicate completion of transfer.

In case an uncorrectable error occurs in the header of PKT, then $TGC_{CN}$ is not modified, neither of the flags associated with $TGC_{CN}$ is changed, and no vortex register is modified. If no uncorrectable error occurs in the header of PKT, but an uncorrectable error occurs in the payload of PKT, then $TGC_{CN}$ is not modified, the completion flag is not modified, the exception flag is set to one, no vortex register is modified, and PKT is discarded.

The cache line of completion flags in $NIC_D$ can be read by processor $PROC_J$ to determine which of the transfer groups have completed sending data to $NIC_J$. In case one of the processes has not completed in a predicted amount of time, processor $PROC_J$ can request retransmission of data. In some cases, processor $PROC_J$ can use a transmission group number and transmission for the retransmission. In case a transmission is not complete, processor $PROC_J$ can examine the cache line of exception flags to determine whether a hardware failure associated with the transfer.

Transfer Completion Action

A unique vortex register or set of vortex registers at location $COMP_L$ can be associated with a particular transfer group $TG_L$. When a particular processor $PROC_J$ involved in transfer group $TG_L$ determines that the transfer of all data associated with $TG_L$ has successfully arrived at $NIC_L$, processor $PROC_J$ can move the data from the vortex registers and notify the vortex register or set of vortex registers at location $COMP_L$ that processor $PROC_J$ has received all of the data. A processor that controls the transfer periodically reads $COMP_L$ to enable appropriate action associated with the completion of the transfer. A number of techniques can be used to accomplish the task. For example, location $COMP_L$ can include a single vortex register that is decremented or incremented. In another example location $COMP_L$ can include a group of words which are all initialized to zero with the $J^{th}$ zero being changed to one by processor $PROC_J$ when all of the data has successfully arrived at processor $PROC_J$, wherein processor $PROC_J$ has prepared the proper vortex registers for the next transfer.

Reading Remote Vortex Registers

One useful aspect of the illustrative system is the capability of a processor $PROC_A$ on node A to transfer data stored in a Remote Vortex Register to a Local Vortex Register associated with the processor $PROC_A$. The processor $PROC_A$ can transfer contents $X_B$ of a Remote Vortex Register $VR_B$ to a vortex register $VR_A$ on a node A by sending a request packet $PKT_1$ to the address of $VR_B$, for example contained in the GRVA field 222 of the VPAK format illustrated in FIG. 2A. The packet $PKT_1$ containing the address of vortex register $VR_A$ in combination with a vortex operation code set to the predetermined value to indicate that a packet $PKT_2$ which has a payload holding the content of vortex register $VR_B$ can be created and sent to the vortex register $VR_A$. The packet $PKT_1$ can also contain a counter identifier CTR that indicates which counter on node A is to be used for the transfer. The packet $PKT_1$ arrives at the node B NIC 100 through the input switch 140 and is transported through lines 142 and 128 to the memory controller logic unit MCLU 106. Referring to FIG. 2B, a lookup FIFO (LUF) 252 is illustrated. In response to the arrival of packet $PKT_1$, an MCLU memory controller $MC_K$ places the packet $PKT_1$ in a lookup FIFO (LUF 252) and also requests data $X_B$ from the SRAM memory banks. A time interval of length DT is interposed from the time that $MC_K$ requests data $X_B$ from the SRAM until $X_B$ arrives at MCLU 106. During the time interval DT, $MC_K$ can make multiple requests for vortex register contents, in request packets that are also contained in the LUF-containing packet $PKT_1$. The LUF contains fields having all of the information used to construct $PKT_2$ except data $X_B$. Data $X_B$ arrives at MCLU and is placed in the FIFO-containing packet $PKT_1$. The sequential nature of the requests ensures proper placement of the returning packets. All of the data used to form packet $PKT_2$ are contained in fields alongside packet $PKT_1$. The MCLU forwards data $X_B$ in combination with the header information from packet $PKT_1$ to the packet-former PF 108 via line 136. The packet-former PF 108 forms the vortex packet $PKT_2$ with format 230 and sends the packet through output switch OS to be transported to vortex register $VR_A$.

In the section hereinabove entitled "Scattering data across the system using payloads stored in vortex registers," packets are formed by using header information from the processor and data from the vortex registers. In the present section, packets are formed using header information in a packet from a remote processor and payload information from a vortex register.

Sending Multiple Identical Packets to the Same Address

The retransmission of packets in the case of an uncorrectable error described in the section entitled "Transfer Completion Action" is an effective method of guaranteeing error free operation. The NIC has hardware to enable a high level of reliability in cases in which the above-described method is impractical, for example as described hereinafter in the section entitled, "Vortex Register PIM Logic." A single bit flag in the header of request packet can cause data in a Remote Vortex Register to be sent in two separate packets, each containing the data from the Remote Vortex Register. These packets travel through different independent networks. The technique squares the probability of an uncorrectable error.

Vortex Register PIM Logic

A useful aspect of the disclosed system includes the ability of a processor to read remote vortex memory. Furthermore, a processor $PROC_A$ can read and then alter the contents of a remote vortex register $VR_B$, a particularly efficient technique because a processor on node A is able to read or modify single words on vortex memory in node B without involving the processor on node B. Moreover, the updates can occur in a way that guaranties atomicity. Additionally, the contents of vortex register $VR_B$, prior to alteration, can be sent to a vortex register $VR_A$ on node A. Hardware associated with each vortex register memory bank is able to perform a number of functions $f_1, f_2, \ldots, f_J$ on the contents of vortex register $VR_B$.

The processor $PROC_A$ is able to alter the contents of a remote vortex register $VR_B$ on $NIC_B$ by sending a packet $PKT_1$ to network interface controller $NIC_B$. The address of vortex register $VR_B$ is included in packet $PKT_1$. In case the contents $X_B$ of vortex register $VR_B$, prior to alteration, is to be returned to a vortex register $VR_A$ on node A, then containing the address of $NIC_A$, the address of vortex register $VR_A$ is included in packet $PKT_1$. Also included in packet $PKT_1$ is an integer W indicating that the function $f_W$ is to be used in the computation to alter contents $X_B$. In case data D is to be used in the alteration of contents $X_B$, then data D is included in the packet $PKT_1$. The read-modify-write operation is performed by modifying the contents $X_B$ held in vortex register $VR_B$ by 1) reading the contents $X_B$ of vortex register $VR_B$; 2) transferring contents $X_B$ to vortex register $VR_A$ in a packet $PKT_2$ if the operation code requests such a transfer; 3) computing function $f_W(X_B, D)$; 4) writing function $f_W(X_B, D)$ into vortex register $VR_B$. To avoid a race condition, these four operations are to be completed before vortex register $VR_B$ is read again.

Referring to FIG. 2C in combination with FIG. 1C, a first embodiment which is operable to enforce atomicity is depicted. The first embodiment to enforce atomicity operates based on reordering of the data to guarantee that a race condition does not occur. The reordering unit 250 is placed on line 128 between the module M and the MCLU 106. A sequence $H_0, H_1, \ldots H_{J-1}$ includes J functions each with domain that includes the address space of the SRAMs 152 and range (0,1). A collection 240 (or group) of memory elements in the reorder unit 250 include N memory bins 242 where $N=2^J$. A bin K contains one or more vortex packets. The bin labeled $a_0, a_1, \ldots a_j$ contains only vortex packets which have a header containing target vortex register addresses ADD where $[H_0(ADD), H_1(ADD), H_{N-1}(ADD)]=[a_0, a_1, \ldots a_j]$. Therefore, no vortex address can appear in two bins. An individual BIN 242 contains E elements 244. The BINs are read and written in a circular fashion. Three integers CA, PIN, and POUT and C control the reading and writing of a given BIN. The counter CA indicates the number of items in BIN, the pointer PIN indicates the next BIN insertion location, and 3) the pointer POUT indicates the next BIN reading location. When an address ADD arrives on line 128 to the reorder unit, the BIN address $BA=[H_0(ADD), H_1(ADD), \ldots H_{N-1}(ADD)]$ is calculated. The reading and writing of BIN(BA) is managed by three integers: 1) a counter CA(BA) that tracks the number of items in BIN(BA); 2) a pointer PIN(BA) that indicates the next insertion location in BIN(BA); and 3) a pointer POUT indicating the next reading location in BIN (BA). The system is designed so that no bin can ever be full. The occurrence of such a condition is considered as an exception. The arriving address is placed in ELEM[PIN(BA)].

Items from the bin collection 240 can be removed by using an irregular stepping scheme designed to reduce the number of items in each bin to a minimum. The scheme is governed by a bin pointer BP and a maximum step parameter SMAX. At a given vortex address removal time, the bins labeled BP, BP+1, ... BP+SMAX−1 are examined. If all of these bins are empty as indicated by the SMAX values of CA(BA), then no address is read at the current address removal time and BP is reset to BP+SMAX. If one or more of the SMAX bins under examination is not empty, then X can be used to denote the first of the SMAX bins that is not empty. ELEM[POUT(X)] can be read and BP can be reset to X+1. Given that there N bins are used and the maximum step size is SMAX, the same address cannot be read from the bin structure in less than N/(SMAX). The parameters N and SMAX are therefore set so that a race condition cannot occur when addresses from the Reorder Unit 250 are sequentially used.

Referring to FIG. 2D, a FIFO of length R in the Reorder Unit 250 is illustrated. The left portion of each element of the FIFO is used for holding vortex addresses. The right side is used for holding the contents of a vortex register. When a vortex address exits the reorder unit, two operations are performed: 1) the packet, or a subset of the fields of the packet to be used, is immediately placed into the left part of the entry level of the R step FIFO; and 2) the memory controller is requested to fetch data $X_B$ into the FIFO to arrive R steps later at FIFO level R−1. The contents of the two halves of the top FIFO level are sent to the packet-former PF 108 in manner described in the section entitled "reading remote vortex registers." Also, the packet is forwarded to the logical unit 254 (see FIG. 2D) performs the function prescribed in packet $PKT_1$. The functional unit may have error correction capabilities. The output $F_W(X_B,D)$ is then written to vortex register $VR_B$. In the event that the logical unit cannot keep up with the timing of the rest of the system, a bank 246 of logical units can be employed and used in a round robin fashion.

Figure 2E:
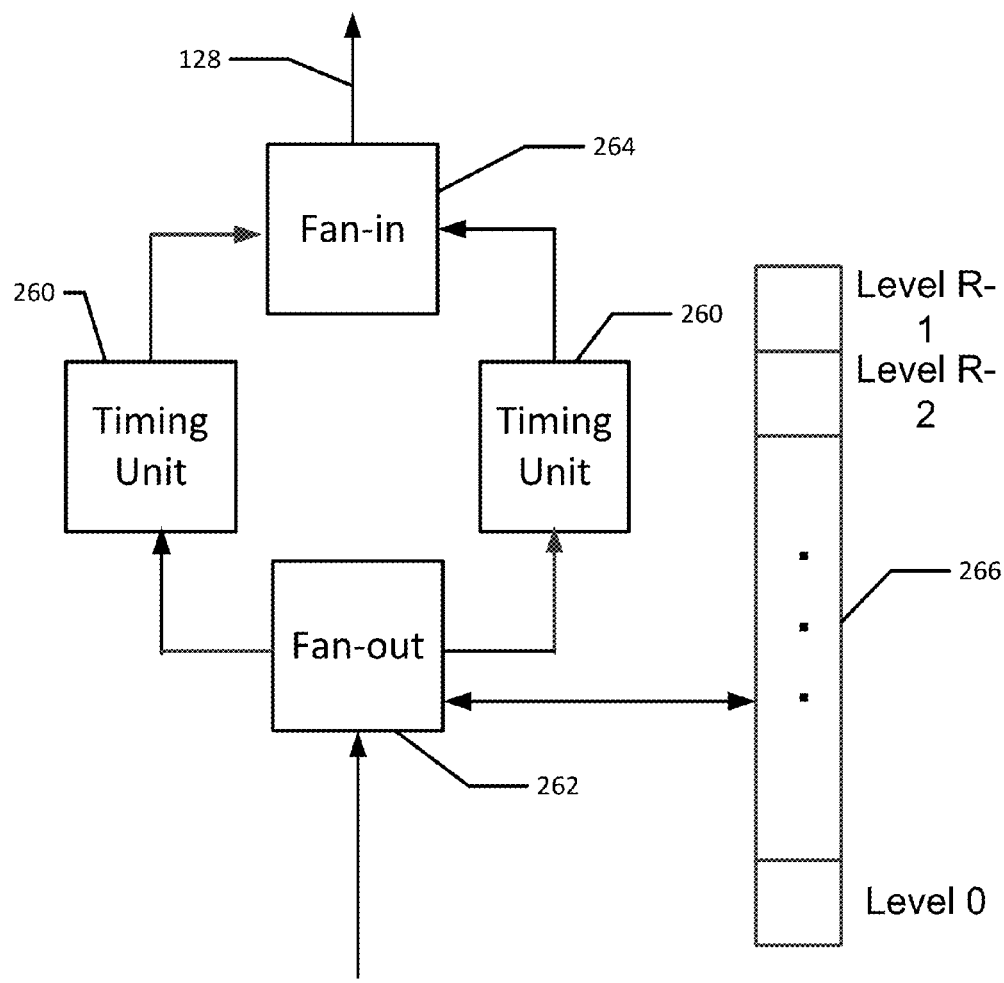
FIG. 2E illustrates an embodiment of timing units and an associated address FIFO.
Figure 2F:
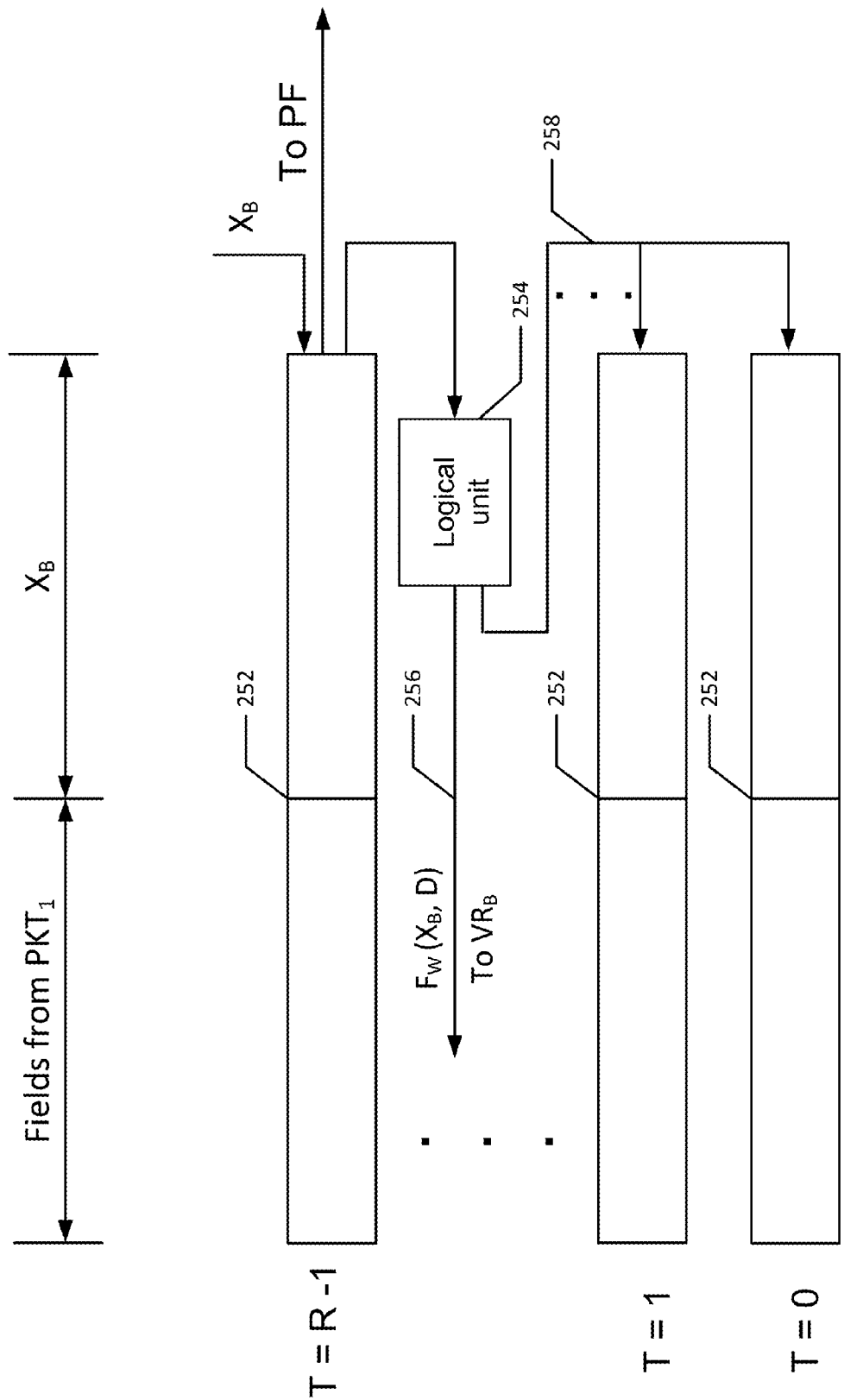
FIG. 2F illustrates an embodiment of a lookup FIFO that can be used in a read-modify-write operation using the second embodiment of atomic operation.

Referring to FIG. 2E and FIG. 2F, a second embodiment to enforce atomicity is depicted and can incorporate an R-length lookup FIFO (shown in FIG. 2F). Prior to inserting a packet PKT into the lookup FIFO, the packet PKT is placed in a timing unit TU 260 that calculates a timing number that is placed in the $X_B$ field across from packet PKT in the lookup FIFO. In case an individual timing unit cannot complete actions in a single clock cycle, multiple timing elements can be employed and a fan-out device 262 and fan-in device 264 can be used to allow the timing units to work in a round robin fashion. FIG. 2E illustrates an embodiment in which two timing units are employed. In other embodiments other numbers of timing devices can be used. An additional address FIFO 266 holds the vortex register $VR_B$ values associated with the R packets that preceded packet PKT into the address FIFO. The packet PKT enters the timing unit along with the R-long sequence $A=A_0, A_1, \ldots A_{R-1}$ of vortex register $VR_B$ values held in the address FIFO. $A_0$ is the vortex register $VR_B$ value of the packet that entered in the time step directly before (one step ahead of) the entrance of packet PKT, $A_1$ is the vortex register $VR_B$ value of the packet that entered two steps ahead of the entrance of packet PKT and so forth. If none of the members of the sequence $A_0, A_1, \ldots A_{R-1}$ is equal to the vortex register $VR_B$ value of packet PKT, then the timing unit outputs the value of zero. If $A_S$ is equal to the vortex register $VR_B$ value of packet PKT and S is the smallest integer for which $A_S$ is equal to the vortex register $VR_B$ value of packet PKT, then the output of the timing unit is R-S. When the sequence A is sent to a timing unit, the address FIFO is shifted and the vortex register $VR_B$ value of packet PKT is entered into the entry level of the address FIFO.

The lookup FIFO associated with the second embodiment to guarantee atomicity is illustrated in FIG. 2F. At each time step, the logical unit broadcasts output to all of the other levels of the FIFO. If the value of the $X_B$ portion of the level L contains the value of L, then the output of the logical unit is placed in the $X_B$ portion of the level L lookup FIFO. If the content of the $X_B$ portion of the top level of the FIFO is 0, then the value of $X_B$ looked-up in the SRAM is inserted into the $X_B$ portion of the top level of the lookup FIFO. The contents of the two halves of the top FIFO level are sent to the packet-former PF 108 in the same manner as described in the section entitled "reading remote vortex registers" Also, the packet is forwarded to the logical unit 254 (see FIG. 2D) performs the function prescribed in packet $PKT_1$. The functional unit may have error correction capabilities. The output, $F_W(X_B,D)$ is then written to vortex register $VR_B$. In the event that the logical unit cannot keep up with the timing of the rest of the system, a bank 246 of logical units can be employed and used in a round robin fashion.

Examples of remote operations include increment, decrement, compare and swap, floating point add, floating point multiply, AND, integer add, and XOR. Other operations can also be incorporated into the arithmetic logic units associated with each of the SRAM memory banks. These arithmetic logic units proceed as follows: 1) read the contents C of the vortex register $VR_B$; 2) send (or double send to reduce the chance of error) to a vortex register $VR_A$ on $NIC_A$; 3) perform the arithmetic operation prescribed by the operation code to produce the result D; 4) write D into $VR_B$, and the like. The address of vortex register $VR_A$ is a function of the address of vortex register $VR_B$, the address of $NIC_A$, and the operation code of the arithmetic operation.

System Network Overview

Figure 3A:
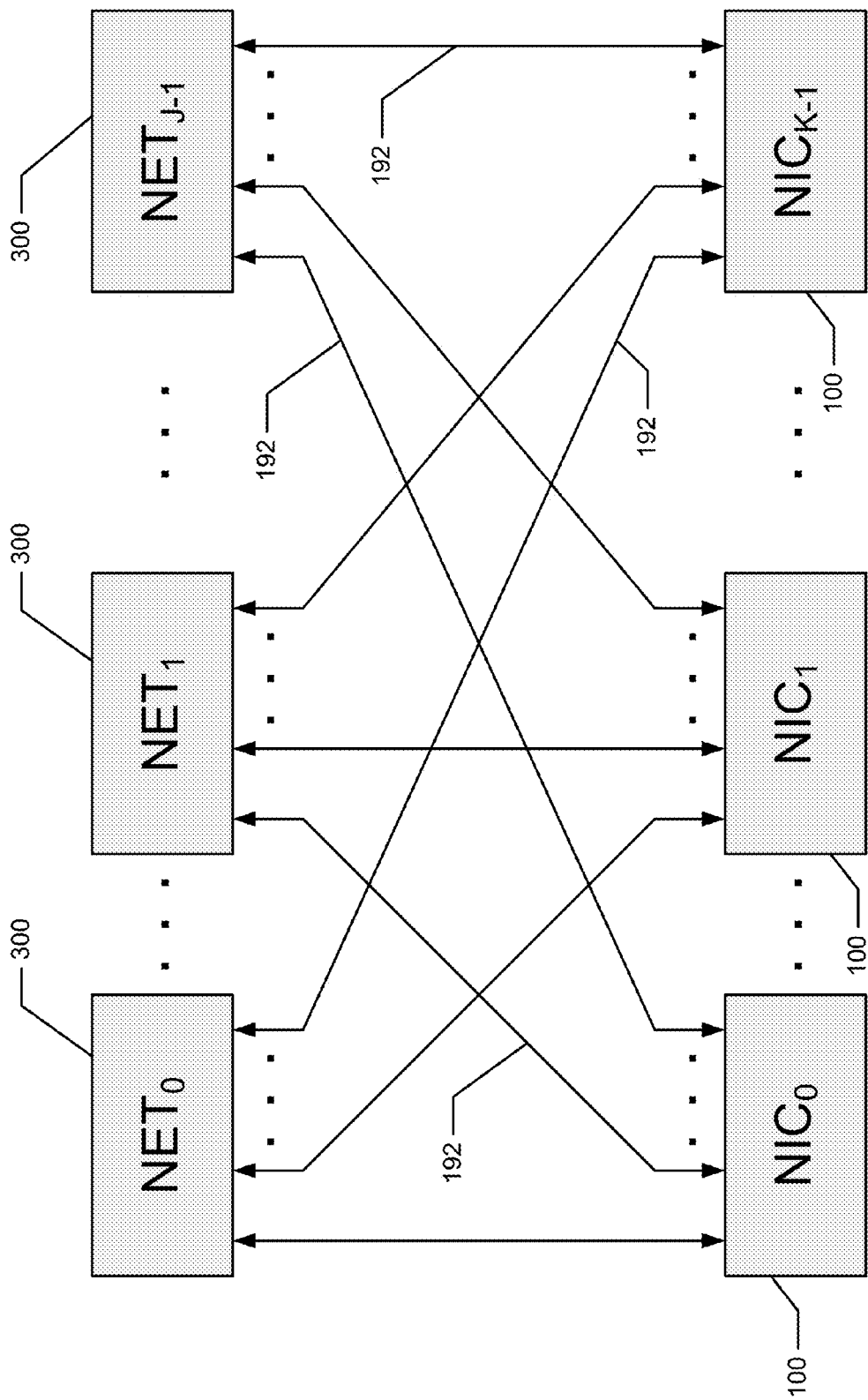
FIG. 3A illustrates an embodiment of interconnection of K NICs using J parallel networks.

FIG. 3A illustrates an embodiment of a Data Vortex® computing and communication system utilizing a parallel network structure comprising J parallel networks connecting K network interface chips. In the illustrative embodiment, each VPAK data packet PKT passes sequentially through the following plurality of elements comprising: 1) a shuffling output switch 120 that scatters packets across the network modules $NET_0, NET_1, \ldots NET_{J-1}$; 2) a routing switch in a $NET_M$ device 300; and 3) a NIC input switch IS 140 that routes the packet to a system processor or to a vortex register. In FIG. 3A, the number of parallel networks is not necessarily equal to the number of network interface chips 100. The operation of the parallel networks can be illustrated by reference to FIG. 3A in conjunction with FIG. 1A and FIG. 1B. A packet PKT traveling from a NIC $N_A$ to a NIC $N_B$ is sent to one of the parallel networks $NET_M$ by the $NIC_A$ output switch OS 120. The target address of $NIC_B$ is contained in the header of packet PKT. The $NIC_A$ output switch OS 120 sends a packet PK to one of the independent networks $NET_M$ using random, pseudo-random, round-robin, or another technique. In the illustrative embodiment the choice of $NET_M$ can be independent of the target destination of packet PKT. The target address of packet PKT is in the header of packet PKT. The hardware in $NET_M$ examines the header of packet PKT and determines that $NIC_B$ is the target of packet PKT. Based on the target address, $NET_M$ routes packet PKT to $NIC_B$. In a first embodiment, each of the networks, $NET_M$, comprises a single switch chip. In a particular embodiment, this single switch chip can contain a Data Vortex® switch.

In a second embodiment, large Data Vortex® computers and communication systems can be constructed by connecting B first embodiment systems in combination with each of the first embodiment systems containing K NICs. Each of the B systems can be referred to as a building block. The building blocks can be connected by using J parallel networks. Each of the parallel networks can contain C central switches.

Figure 3B:
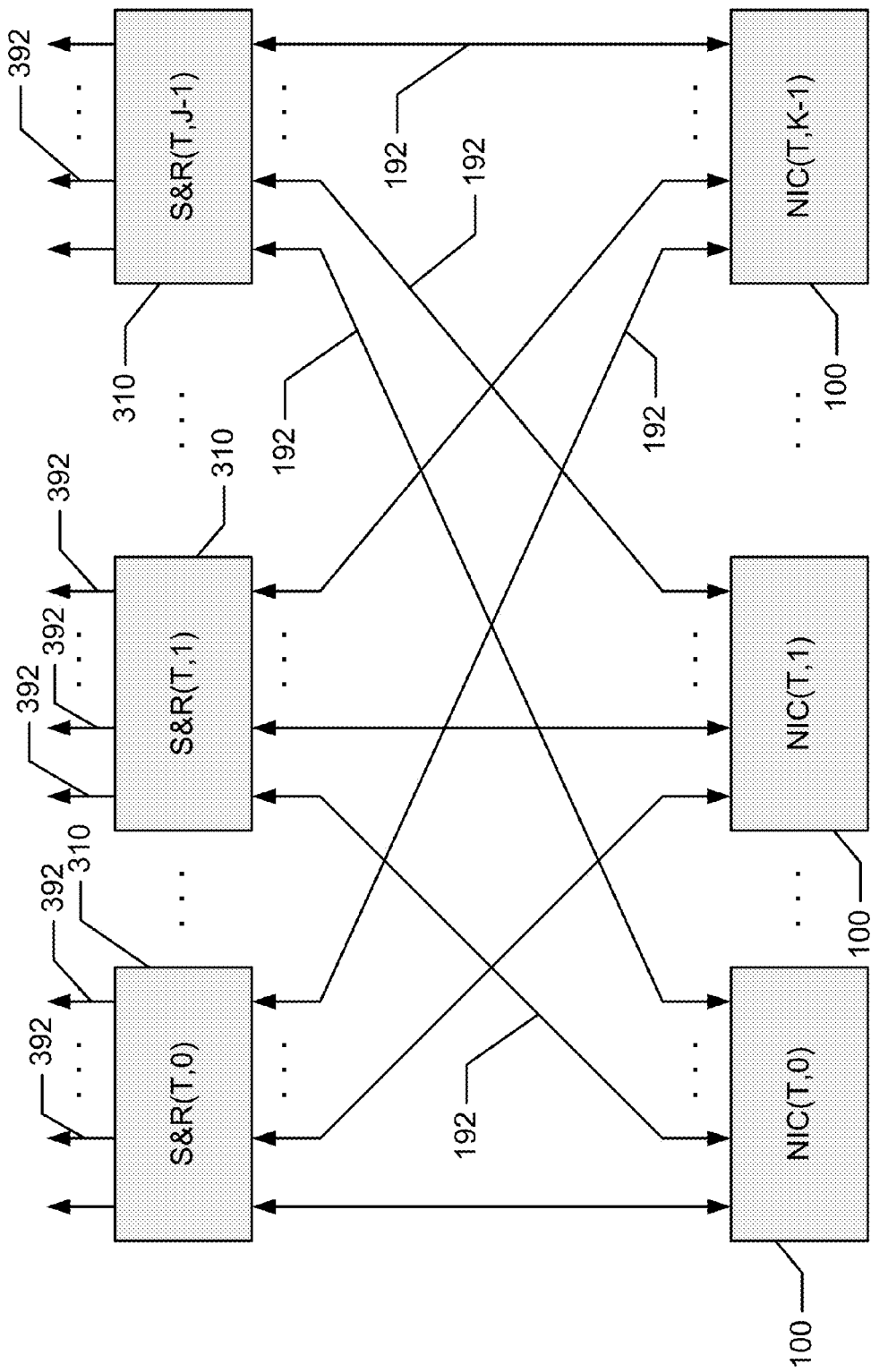
FIG. 3B and FIG. 3C illustrate embodiments of the interconnection of groups of modules with each module containing K NICs.
Figure 3C:
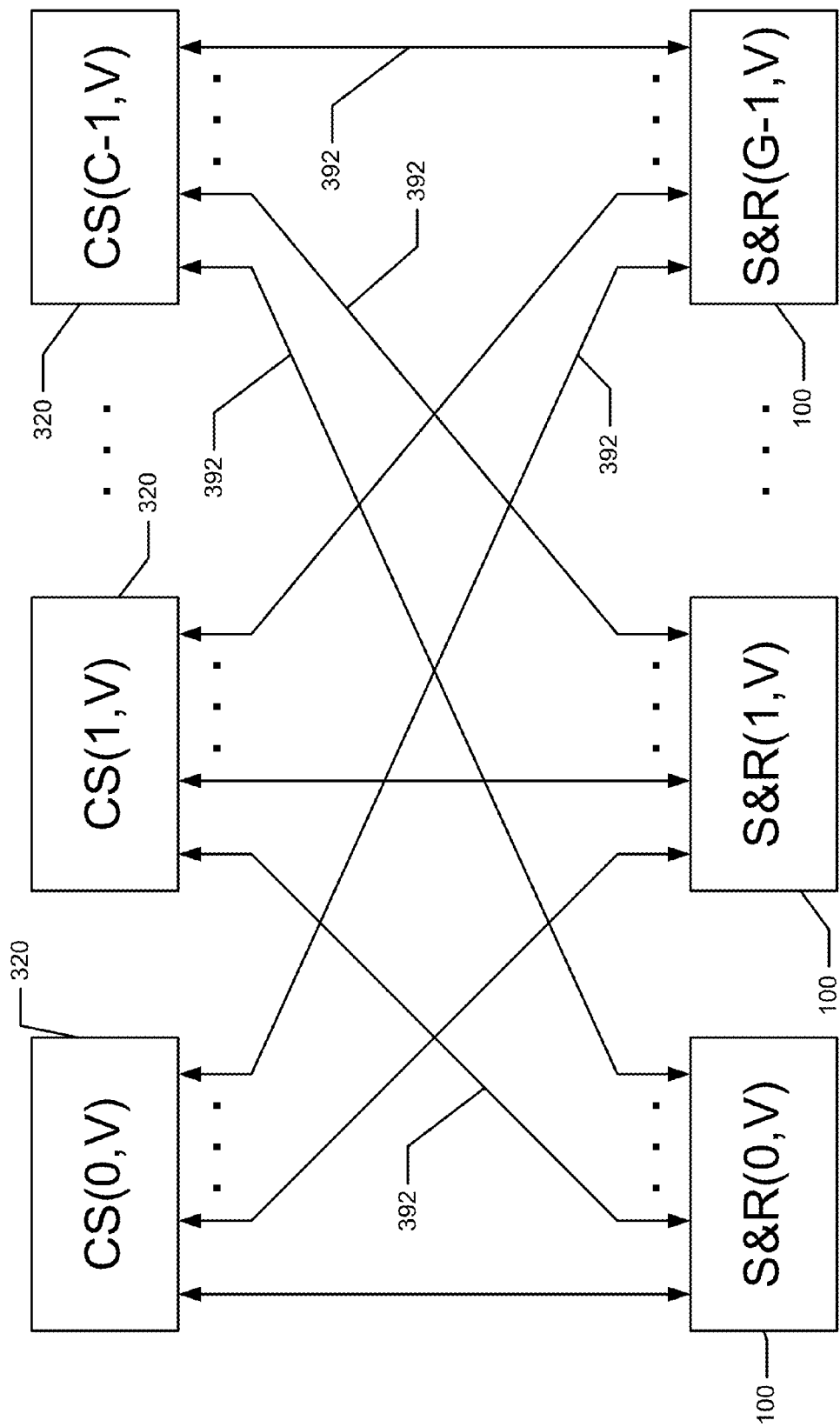

FIG. 3B illustrates the K NIC chips in a single building block (building block T). The K NICs in building block T are denoted by NIC(T,0), NIC(T,1), . . . , NIC(T,K−1). The K NICs are connected to J devices labeled S&R (T,0), S&R(T, 1), . . . , S&R(T,J−1). All of the S&R devices with the same second term are members of the same parallel network. FIG. 3C illustrates the connections to the C central switches in one of the J parallel networks. The parallel network referenced as network V contains the devices S&R (0, V), S&R (1, V), . . . , S&R(G−1, V). The C central switches in network V are labeled CS(0, V), CS(1, V), . . . , CS(C−1,V).

The data passes through the devices shown in FIG. 3B and FIG. 3C as follows: 1) a VPAK packet PKT traveling from a NIC (T,X) to a NIC (Y,Z) contains the target address (Y,Z) in the packet PKT header. The output switch OS 120 sends a packet PKT through a link 192 to a shuffle and route module S&R(T,W). The shuffle and route module S&R shuffles packets entering from a NIC and routes packets entering from a central switch. In the depicted embodiment, the output switch OS does not use the target address (Y,Z) to determine which S&R module receives PKT. In one embodiment, the output switch OS scatters packets in manner that contains a pseudo-random component to the CS components in building block V. The shuffle and route S&R module S&R(T,W) scatters packets using a method that has a pseudo-random component through links 392 to the central switches. The packet PKT enters a central switch and the central switch uses the target address in the packet PKT header to route the packet PKT to the shuffle and route S&R module in the building block indicated in the target address portion of the packet PKT header.

The S&R module then routes packet PKT to the input switch of the packet's target network interface controller NIC. The input switch routes packet PKT through traffic management module M 102 to a memory controller 106 that is connected to the memory bank $MB_X$ containing the target vortex register of packet PKT.

Virtual Channels

Referring to FIG. 1A, the packets travelling through link 128 can include packets of different types such as: 1) a type-one packet P1; 2) a type-two packet P2; 3) a type three-packet P3; and higher type packets. The type-one packet P1 can travel from the packet-former PF 108 through link 128 that alters the contents of the SRAM vortex registers 152 but does not cause a packet to travel from the packet-former PF 108 through link 132. The type-two packet P2 causes a packet Q2 to travel through link 132. The packet Q2 subsequently travels through a line 124 then through a line 144 into a remote node RN. The packet Q2 can alter the contents of the vortex registers in the node RN but does not cause a packet to travel through line 132 in RN. The type-three packet P3 causes a packet Q3 to travel from the packet-former PF 108 through link 132. The packet Q3 subsequently travels through a line 124 then through a line 144 into a remote node RN. The packet Q3 can alter the contents of the vortex registers in the node RN and moreover, the packet Q3 causes a packet to travel through line 132 in RN. Packets of different types travel in separate virtual channels through the system. Each time a packet passes out of input switch IS 140 through line 142; the packet type is decremented by one. A type four packet can be a "surprise" packet that is sent by the management unit M 102 through link 122 directly to a processor. A type five packet is a "surprise" packet that is given a high quality of service status. In one illustrative embodiment, depicted herein, two virtual channels are utilized, with packets of type two traveling in one virtual channel and packets of type three traveling through the other virtual channel.

Figure 4A:
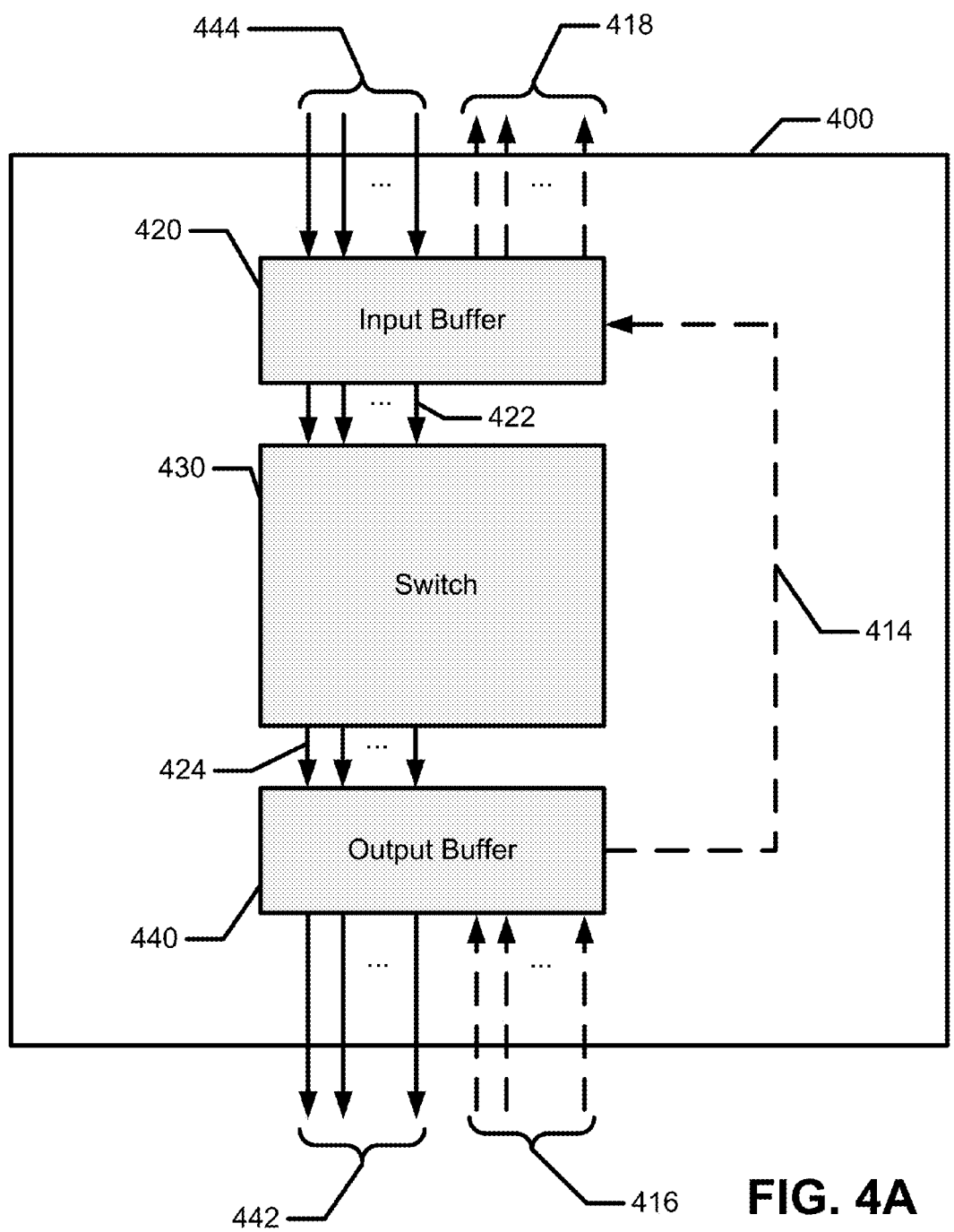
FIG. 4A illustrates an embodiment of the buffers and control lines in a Data Vortex® switch.
Figure 4B:
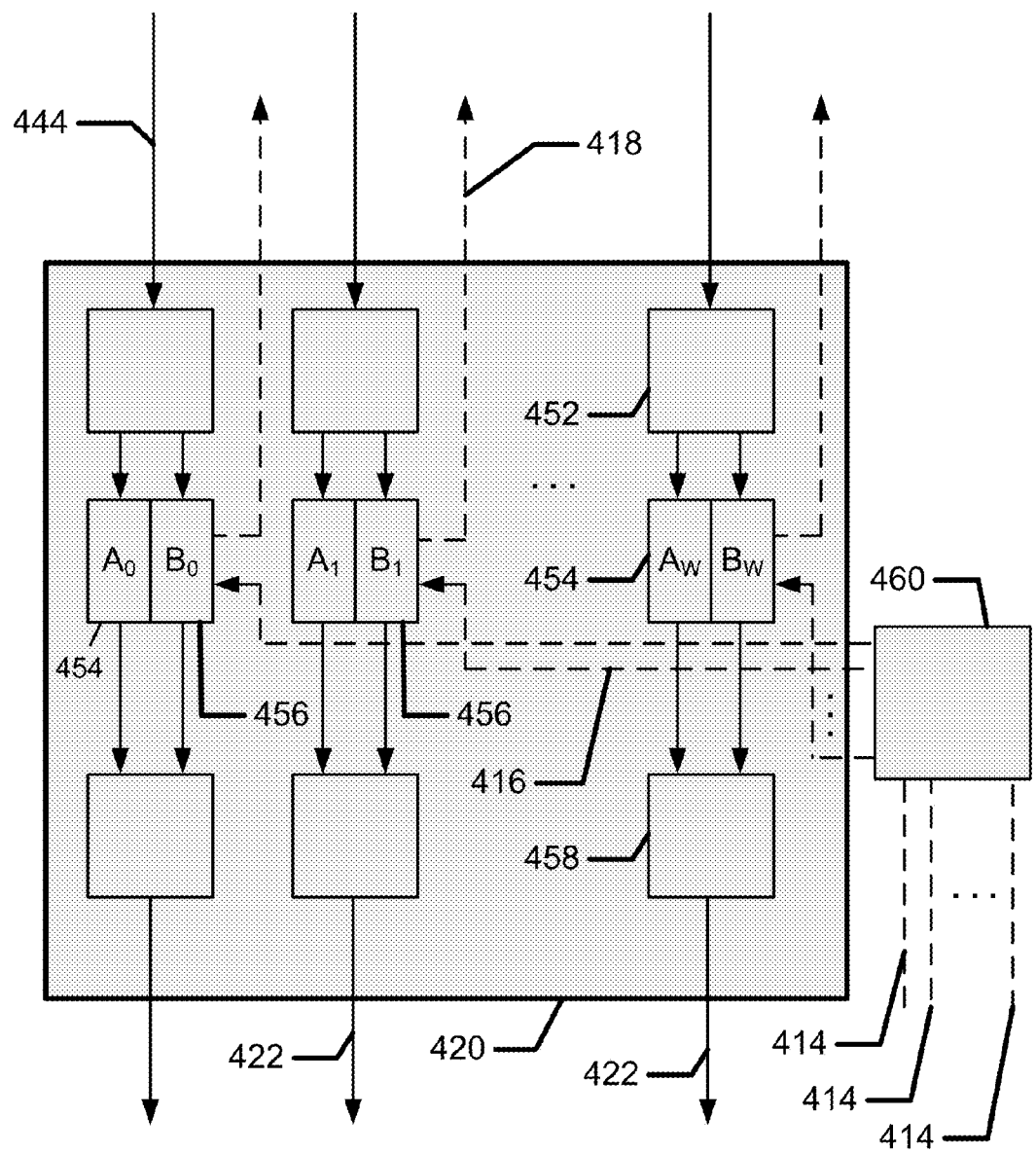
FIG. 4B illustrates an embodiment of the input buffers to a switching module utilizing virtual channels.
Figure 4C:
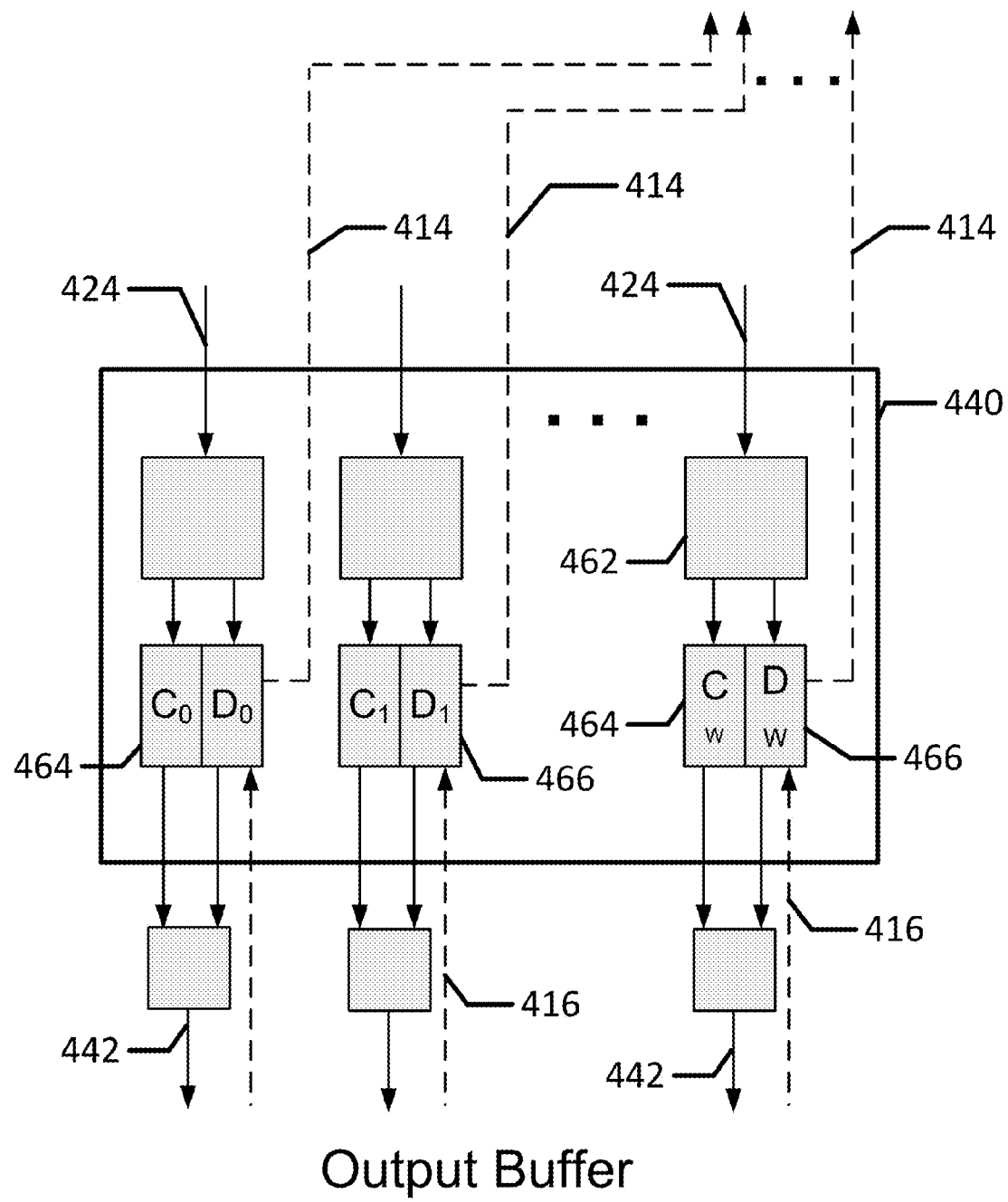
FIG. 4C illustrates an embodiment of the output buffers in a switching module utilizing virtual channels.

Referring to FIGS. 4A, 4B, and 4C, the flow control mechanism in a switch in the system is depicted. The purpose of the flow control mechanism is to prevent the buffer 400 from overflowing. The switch 430 can represent the NIC output switch 120, a net switch 300, a shuffle and route S&R switch 310, a CS switch 320, or the like. The input buffer illustrated in FIG. 4A is divided into a multiple sub-buffers with one or more sub-buffers connected to an input line 444. The input line 444 is positioned to carry a packet PKT from a sending device SD (not illustrated) to the input buffer 420. Referring to FIGS. 4B and 4C, details of the buffers 400 and 440 for usage in sending and receiving packets in virtual channels are illustrated. The lines 444 and 424 are capable of carrying two virtual channels (channel α and channel β) wherein the packets in virtual channel α are stored in physical buffer $B_0$, $B_1, \ldots B_W$ 456 and the packets in virtual channel β are stored in physical buffer $B_0, B_1, \ldots B_W$ 456. The lines 422 and 424 also carry both channel α and channel β. The packets in virtual channel α are stored in output buffers $C_0, C_1, \ldots C_W$ 464 while the packets in virtual channel β are stored in output buffers $D_0, D_1, \ldots D_W$ 466. Each of the output buffers in these two sequences is a sending device SD that is involved in the flow control system. A given output buffer sending device $C_K$ contains a counter OKα that, at a given time, contains a non-negative integer not exceeding the integer MAX. If at a packet sending time, $A_K$ is not empty, and OKα contains a positive value, then $A_K$ sends a packet down line 442 and decrements OKα. $C_K$ is not allowed to send a packet if OKα contains 0. Line 416 carries tokens. When a reset token arrives on line 416, the value of OKα is set to MAX. $D_K$ can have control logic with similar form and functionality to device $C_K$. The insertion of tokens in line 416 is described hereinafter.

FIG. 4B illustrates the input buffers. An α channel packet PKTα and a β channel packet PKTβ have a special virtual channel header bit VC set to 0 for PKTα and set to 1 for PKTβ. The device 452 senses the value of VC and sends incoming packets with bit VC set to zero to an α buffer Bα and sends incoming packets with bit VC set to one to a β buffer Bβ. A counter is associated with the α and β buffers and is set to an initial value VI. The counters decrement according to a clock. When the counter reaches zero, the counter is reset to VI, and a special token packet is sent from a module associated with buffers $A_K$ and $B_K$ through line 418 to device SD. A buffer constant CB is used in flow control. The token packet contains an ordered-bit pair (bα, bβ). The bit bα is set to one only in case fewer than CB packets are in Bα. The bit bβ is set to one only in case fewer than CB packets are in Bβ. In case bα=1, OKα is reset to a maximum value. In case bβ=1, OKβ is reset to a maximum value. The values of CB and MAX are such that the above rules prevent the buffers Bα and Bβ from overflowing.

The data vortex switch and associated flow control mechanism have the property that congestion is prevented provided that no output buffer backs data back up into the switch.

In addition to FIGS. 4A and 4B, FIG. 4C illustrates a portion of the output buffers of switch 400. A preset integer AB and a preset number Δt are used in the control mechanism. A clock or counting device (not shown) at time intervals Δt sends a signal to each of the buffers $C_0, C_1, \ldots C_W$ 464 and $D_0, D_1, \ldots D_W$ 466. In response to the signal, each pair of buffers ($C_U, D_U$) sends a two-bit signal up line 414 with the first bit of the signal set to 1 if fewer than AB packets are contained in $C_U$ and otherwise set to 0; and the second bit of the signal set to 1 if fewer than AB packets are contained in $D_U$ and otherwise set to 0. The device 460 constructs a word WD with length (2W+2) equal to the total number of buffers in the sequences 464 and 466. The word WD contains an ordered list of the signals received on lines 414. Device 460 broadcasts the ordered list to each of the buffers 454 and 456. A switch input buffer $A_J$ is able to forward a packet to a switch output buffer $C_K$ only in case a one is contained in word WD corresponding to the buffer $C_K$. Similarly, a switch input buffer $B_J$ is able to forward a packet to a switch output buffer $D_K$ only in case a one is contained in the word WD corresponding to the buffer $D_K$. The proper choice of the constants AB and Δt guarantee that sufficient room is always available in the output buffers.

Injection Logic Between an Input Buffer and a Data Vortex® Switch

Referring to FIG. 4A and FIG. 4B, an input buffer 420 sends data to a switch 430 from module 458 through links 422. In a system that is to minimize latency, each line 422 is able to insert data in to multiple locations in the top level of the Data Vortex® switch. For a particular module MOD 458, a packet PKT can be inserted at angles $ANG_0$ at time $t_0$, $ANG_1$, at time $t_1 \ldots, ANG_\phi$, at time $t_\phi$). In one embodiment, at least a portion of the module 458 is located on the same chip as switch 430 and therefore shares the same clock. Therefore, module 458 can compute the ideal angle from the sequence of angles $ANG_0, ANG_1, \ldots, ANG_\phi$, to insert the next packet. The proper insertion node also depends upon the availability of the input node at the ideal angle based on the absence of a blocking node from the input node.

The Network Interface Controller (NIC) Output Switch

Figure 5A:
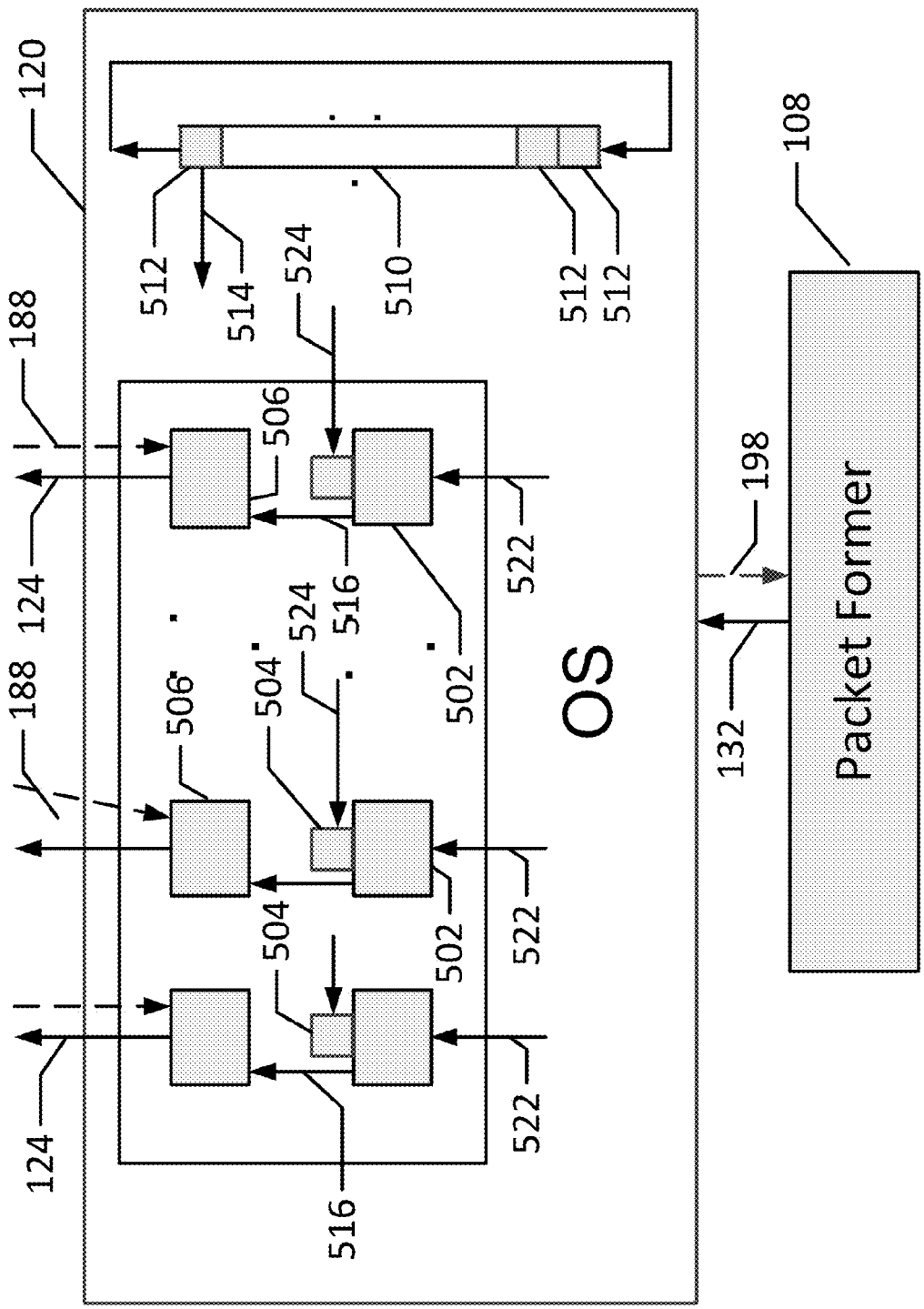
FIG. 5A illustrates an embodiment of a network interface controller (NIC) output switch.

Referring to FIG. 5A in conjunction with FIG. 1A, an output switch can receive packets PKTs from the packet-former PF 108 on line 132 and send the packets out in a pseudo-random fashion through lines 124 into the network that connects the NICs. The pseudo-random sequence of output port addresses can be stored in the address port circular FIFO 510. The properties of the sequence of output switch address ports in the circular FIFO 510 are discussed hereinafter in the present section. Associated with each output port J are three components: 1) an output register $OR_J$ 502 that is capable of holding a single vortex packet; 2) an output logic gate $LG_J$ 504 that controls the flow of packets out of $OR_J$; and 3) a NIC output port buffer $OB_J$ 506 that receives packets from output register $OR_J$ 502 and forwards the packets out of output ports J into lines 124.

The packet-former 108 produces an entire packet (both header and payload) and sends the entire packet PKT to the output switch 120.

Therefore, in the disclosed embodiment the width of channel 132 is the length of the packet PKT. Each time that the packet-former produces a packet, that packet is immediately forwarded to all of the output registers 502 using a fan-out component and technique (not pictured) that receives packets on line 132 and delivers the packets via lines 522 to all of the output registers 502. The circular FIFO 510 has an output line 514 that uses a fan-out component and technique (not pictured) to spread output to all lines 524 that simultaneously deliver the output line J from the output port of 510 to each device 504. Therefore, all of the elements 502 and 504 receive data simultaneously. Thus, the output packet from the packet-former 108 and the output line address from the address port circular FIFO arrive at the specified targets in the same clock tick. Exactly one output logic gate $LG_J$ 504 contains the integer J. If: 1) line 124 is idle and 2) based on the control signal information from line 188, the flow control logic in output port buffer $OB_J$ 506 indicates that line 124 is free to accept a packet, then the packet in output register $OR_J$ is forwarded to output port buffer $OB_J$. Line 516 has the width of a packet so that the actions are completed in a single tick.

If output register $OR_J$ does not forward the contents to output port buffer $OB_J$, then no packet is sent at that tick and the output switch sends a control signal via line 198 to the packet-former 108 to delay the packet forming activity until a free line is available. In the next time step, a new output line is identified by using the next value in the circular shift register 510 to attempt to send the packet that failed to be sent on the previous time step.

The sum of the data rates from the output registers exceeds the data rate into the output switch from the packet-former by a sufficient amount that, at any given time, a number of lines 124 are empty. Moreover, an integer NA exists such that at a packet sending time T, if the output line K did not send data in the last NA data sending times, then the output line K is available to send data at the present time. This information can be used to construct the sequence $A = a_0, a_1, \ldots a_z$ of output line addresses in the Z-long circular FIFO 510 as follows: 1) the sequence of output lines from OS as $OL_0, OL_1, \ldots, OL_{\Sigma-1}$ is defined; 2) NA distinct non-negative integers are chosen with each less than $\Sigma$ to fill the first NA members of sequence A; 3) a non-negative random number r is chosen which is not in $a_0, a_1, \ldots a_{NA-1}$ and $a_{NA}$ is set equal to r. The process is continued such that each for $K < \Sigma$, $a_K$ is set to a random number not in the sequence $a_{(K-NA)}, a_{(K-NA+1)}, \ldots a_{(K-1)}$. Every NA+1 string of the sequence A not containing $a_0$ contains NA+1 distinct addresses. In case the sum of the bandwidths of the output switch output lines is less than half of the bandwidth from the packet-former 108, then the sequence A can be constructed so that every N+1 long string of A contains N+1 distinct addresses.

In case a flaw exists in the network associated with a given output port J, the integer J can be omitted from the sequence A. If reducing the data rate through the network is desired, a certain number of repeats can be injected in N+1-long strings of the sequence A. In another example embodiment, the circular FIFO can be omitted and the sequence on line 514 replaced by a sequence which is continually generated by supplying random numbers using the algorithm to fill the FIFO 510.

Randomizing Network Switch

In a first example embodiment, the randomizing Network Switch RNS can include a radix-J Data Vortex switch and a plurality of devices PR that produce pseudo-random integers in the interval [0, J−1]. In one instance, one such device can be located at each input port of the Data Vortex switch. When a packet PKT [P, H] arrives at an input port of the Data Vortex, a device PR produces a random integer X and forms a packet of the form [P, H, X, 1]. Upon exiting the Data Vortex switch at output port X, the packet [P,H] is placed in the randomizing network switch RNS output buffer of randomizing network switch RNS. All of the standard flow controls described herein can be used to govern the transfer of packet PKT from the randomizing network switch RNS output buffer to the output line X.

In a second example embodiment, data streaming into multiple input ports of a network randomizing device can be preprocessed to be presented to the network randomizing device in the same fashion that data can be presented to the NIC output switch.

A third embodiment which does not use preprocessing is presented hereinafter in the present section.

Referring to FIG. 3B, FIG. 5A, and FIG. 5B, a first application for a randomizer can be in the NIC Output Switch 120, as discussed hereinbefore in the section entitled "The Network Interface Controller (NIC) Output Switch." A second randomizing device can be included in the network S&R switching modules 310. The second randomizing device is discussed herein. FIG. 5B illustrates the second randomizing device which contains J output ports. The circular FIFO 510 is loaded exactly as in the previous case, as before, no N+1 adjacent members of A contain two identical output port addresses. The circular FIFO contains a plurality of crossbar output port addresses. The circular FIFO also contains an output location 512 that sends contents down line 514. The flow control device FC 532 contains two J long memory devices including: 1) a permission memory device PM that limits the number of packets that can be sent to the crossbar output buffers; and 2) a request memory device RM that holds requests for output port locations. The number of packets allowed in an output buffer OB 506 is limited by the design parameter LIM. At periodic token sending times, if the number of packets in a given output port buffer $OB_P$ becomes less than LIM/2, then output port buffer $OB_P$ sends a token packet on line 516 to the permission memory device PM location P, allowing flow control device FC 532 to send up to LIM/2 packets to output port buffer $OB_P$. The flow control line 516 from output port buffer $OB_P$ is connected to location p in the J-long permission memory device PM. When a signal from output port buffer $OB_P$ arrives at position P of permission memory device PM, the location P of permission memory device PM is updated to LIM/2. When a packet arrives on line 192 at the input device buffer $IB_P$ 530, input device buffer $IB_P$ sends a request for an output port to flow control device FC 532 on line 524. The request places a 1 in position p of request memory device RM located in flow control device FC 532. Flow control device FC 532 processes requests by cycling through the request memory device RM. When flow control device FC 532 finds a 1 location P of the request memory device RM, and the contents of location P in the permission memory device is positive, flow control device FC 532 broadcasts a response packet to each input buffer with the response packet of the form (P, OUT) where OUT is the contents of 512 that was last sent to flow control device FC 532. Flow control device FC 532 then decrements the contents of location P in the permission memory device PM and requests the contents of the next cell in circular FIFO 510 and places a 0 in location P of the request memory device RM. Input device buffer $IB_P$ senses the P in the response packet (P,OUT) and, therefore, input device buffer $IB_P$ responds to the arrival as follows: 1) input buffer $IB_P$ sets a send flag (not shown) to 1 indicating that at the next packet insertion time, $IB_P$ will insert a packet; 2) input buffer $IB_P$ then sends the integer pair (P, OUT) on line 540 to permutation former PERMF 544; and 3) when permutation former PERMF 544 has received NA (P, OUT) packets, permutation former PERMF 544 creates a partial permutation PP using the NA pairs, (P, OUT). This operation is possible since no two pairs have the same first term. The permutation former PERMF 544 applies the permutation to the crossbar switch through lines 542 and broadcasts permission to all crossbar input buffers to begin transmission. In response to the permission signal from permutation former PERMF 544, those crossbar input buffers 530 with a send flag set to 1 begin transporting packets through the crossbar.

Multiple Randomizing Devices

If a given randomizing device RM with J outputs cannot keep up with the flow of data, the number NUM of randomizing devices can be employed with each device having J/NUM output ports.

Packaging Considerations

Randomizing elements can always be paired with a routing element so that the control packets of one of the elements of the randomizer can be carried by the data packets of the routing device and the control packets of the routing device can be carried in the same channels with data packets for the randomizing device.

Physical Channels

Another example embodiment can include no virtual networks. Mutually-exclusive physical channels can be specified with each channel carrying only one type of packet. Packets of type α can be placed in a physical network that does not contain packets of type β and packets of type β can be placed in physical channels that contain no α type packets. The pair of buffers 464 and 466 can be replaced by a single buffer. Also the pair of buffers 454 and 456 can be replaced by a single buffer.

In another embodiment, a computer can be composed of sub-computers located in different remote locations. A useful condition is that separate physical channels are used avoid a long round-trip of data. In still another embodiment, nodes can be of different types. For example, a first type of computer can be used for computing and a second type for communication and use of separate physical channels can improve efficiency.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data handling apparatus comprising:
a network interface controller configured to interface a processing node to a network, the network interface controller comprising:
a network interface comprising a plurality of lines coupled to the network for communicating data on the network;
a register interface comprising a plurality of lines coupled to a plurality of registers;
a processing node interface comprising at least one line coupled to the processing node for communicating data with a local processor local to the processing node, the local processor being configured to read data to and write data from the plurality of registers; and
a packet-former configured form packets comprising a header and a payload, the packet-former configured to use data from the plurality of registers to form the header and to use data from the local processor to form the payload, and configured to insert formed packets onto the network; and
the local processor local to the processing node coupled to the network interface controller via the processing node interface, the local processor configured to send a packet CPAK of a first class to the network interface controller for storage in the plurality of resisters wherein the CPAK comprises a plurality of K fields $F_0, F_1, \ldots F_{K-1}$, ones of the plurality of K fields $F_0, F_1, \ldots F_{K-1}$ comprising a global address GVRA of a remote register, an operation code VOC, and a counter CTR configured to be decremented in response to arrival of a packet at a network interface controller that is local to the remote register identified by the global address GVRA; wherein:
the first class of packets CPAK specifies usage for transferring data between the local processor and the network interface controller.

2. The data handling apparatus according to claim 1 wherein:
ones of the plurality of K fields $F_0, F_1, \ldots F_{K-1}$ further comprise an error correction information ECC.

3. The data handling apparatus according to claim 1 wherein:

the packet CPAK further comprises a header including an operation code COC indicative of whether the plurality of K fields $F_0, F_1, \ldots F_{K-1}$ are to be held locally in the plurality of registers coupled to the network interface controller via the register interface.

4. The data handling apparatus according to claim 1 wherein:
the packet CPAK further comprises a header including a base address BA indicative of whether the plurality of K fields $F_0, F_1, \ldots F_{K-1}$ are to be held locally at ones of the plurality of registers coupled to the network interface controller via the register interface at addresses BA, BA+1, ... BA+K−1.

5. The data handling apparatus according to claim 1 wherein:
the packet CPAK further comprises a header including an error correction information ECC.

6. The data handling apparatus according to claim 1 wherein:
the network interface controller further comprises a first-in first-out (FIFO) input device wherein a packet with a header specifying a special GVRA address causes the packet to be sent to the FIFO input device and the FIFO input device transfers the packet directly to a remote processor specified by the GVRA address.

7. The data handling apparatus according to claim 1 wherein:
the local processor local to the processing node is configured to send a cache line of data locally to the plurality of registers coupled to the network interface controller via the register interface.

8. The data handling apparatus according to claim 7 wherein:
the cache line of data comprises a plurality of elements $F_0, F_1, \ldots F_N$.

9. The data handling apparatus according to claim 1 further comprising:
the local processor local to the processing node coupled to the network interface controller via the processing node interface, the local processor configured to send a packet CPAK of a first class to the network interface controller via the processing node interface wherein the packet CPAK comprises a plurality of K fields $G_0, G_1, \ldots G_{K-1}$, a base address BA, an operation code COC, and error correction information ECC.

10. The data handling apparatus according to claim 9 wherein:
the operation code COC is indicative of whether the plurality of K fields $G_0, G_1, \ldots G_{K-1}$ are payloads of packets wherein the packet-former forms K packets, the individual packets including a payload and a header, the header including information for routing the payload to a register at a predetermined address.

11. The data handling apparatus according to claim 9 wherein:
the packet-former is configured to form a plurality K of packets VPAK of a second type $P_0, P_1, \ldots, P_{K-1}$ such that for an index W, a packet $P_W$ includes a payload $G_w$ and a header containing a global address GVRA of a target register, a local address LNA of the network interface controller, a packet operation code, a counter CTR that identifies a counter to be decremented upon arrival of the packet $P_W$, and error correction code ECC that is formed by the packet-former when the plurality K of packets VPAK of a second type have arrived.

12. The data handling apparatus according to claim 11 wherein:

the network interface controller further comprises an output switch and logic configured to send the plurality K of packets VPAK of the second type $P_0, P_1, \ldots, P_{K-1}$ through the output switch into the network.

13. The data handling apparatus according to claim 11 wherein:
the global address GVRA of a target register indicates that a packet is to be delivered to a special register.

14. The data handling apparatus according to claim 11 further comprising:
the local processor local to the processing node coupled to the network interface controller via the processing node interface, the local processor configured to receive a packet VPAK of a second class from the network interface controller via the processing node interface wherein the network interface controller is operable to transfer the packet VPAK to a cache of the local processor as a CPAK payload and to transform the packet VPAK to memory in the local processor.

15. A data handling apparatus comprising:
a network interface controller configured to interface a processing node to a network, the network interface controller comprising:
a network interface comprising a plurality of lines coupled to the network for communicating data on the network;
a register interface comprising a plurality of lines coupled to a plurality of registers;
a processing node interface comprising at least one line coupled to the processing node for communicating data with a local processor local to the processing node, the local processor being configured to read data to and write data from the plurality of registers; and
a packet-former configured form packets comprising a header and a payload, the packet-former configured to use data from the local processor to form the header and to use data from the plurality of registers to form the payload, and configured to insert formed packets onto the network; and
the local processor local to the processing node coupled to the network interface controller via the processing node interface, the local processor configured to send a packet CPAK of a first class to the network interface controller for storage in the plurality of resisters wherein the packet CPAK comprises a plurality of K fields $F_0, F_1, \ldots F_{K-1}$, ones of the plurality of K fields $F_0, F_1, \ldots F_{K-1}$ comprising a global address GVRA of a remote register, an operation code VOC, and a counter CTR configured to be decremented in response to arrival of a packet at a network interface controller that is local to the remote register identified by the global address GVRA; wherein:
the first class of packets CPAK specifies usage for transferring data between the local processor and the network interface controller.

16. A data handling apparatus comprising:
a network interface controller configured to interface a processing node to a network, the network interface controller comprising:
a network interface comprising a plurality of lines coupled to the network for communicating data on the network;
a register interface comprising a plurality of lines coupled to a plurality of registers;
a processing node interface comprising at least one line coupled to the processing node for communicating data with a local processor local to the processing node, the local processor being configured to read data to and write data from the plurality of registers; and logic configured to receive packets comprising a header and a payload from the network and further configured to insert the packets into ones of the plurality of registers as indicated by the header, wherein:
the logic is configured to receive a packet VPAK from the network, perform error correction on the packet VPAK, and store the error-corrected packet VPAK in a register of the plurality of registers specified by a global address GVRA in the header.

17. The data handling apparatus according to claim 16 wherein:
the network interface controller further comprises a plurality of group counters including a group with a label CTR that is initialized to a number of packets to be transferred to the network interface controller in a group A.

18. The data handling apparatus according to claim 17 wherein:
the network interface controller further comprises a plurality of flags wherein the plurality of flags are respectively associated with the plurality of group counters, and a flag associated with the group with a label CTR is initialized to zero the number of packets to be transferred in the group of packets.

19. The data handling apparatus according to claim 18 wherein:
the plurality of flags are distributed in a plurality of storage locations in the network interface controller to enable a plurality of flags to be read simultaneously.

20. The data handling apparatus according to claim 18 wherein:
the network interface controller further comprises a plurality of cache lines that contain the plurality of flags.

21. The data handling apparatus according to claim 16 wherein:
the network interface controller further comprises a plurality of group counters including a group with a label CTR that is initialized to a number of packets to be transferred to the network interface controller in a group A; and
the logic is configured to receive a packet VPAK from the network, perform error correction on the packet VPAK, store the error-corrected packet VPAK in a register of the plurality of registers specified by a global address GVRA in the header, and decrement the group with the label CTR.

22. The data handling apparatus according to claim 21 wherein:
the network interface controller further comprises a plurality of flags wherein the plurality of flags are respectively associated with the plurality of group counters, and a flag associated with the group with a label CTR is initialized to zero the number of packets to be transferred in the group of packets; and
the logic is configured to set the flag associated with the group with the label CTR to one when the group with the label CTR is decremented to zero.

23. The data handling apparatus according to claim 22 further comprising:
the local processor local to the processing node coupled to the network interface controller via the processing node interface wherein the local processor is configured to determine whether the flag associated with the group with the label CTR is set to one and, if so, to indicate completion of transfer.

24. The data handling apparatus according to claim 16 wherein:
the network interface controller is configured to simultaneously transfer a plurality of packet transfer groups.

* * * * *